(12) United States Patent
Shou

(10) Patent No.: US 8,068,985 B1
(45) Date of Patent: Nov. 29, 2011

(54) METHOD OF PRECISE EARTHQUAKE PREDICTION AND PREVENTION OF MYSTERIOUS AIR AND SEA ACCIDENTS

(76) Inventor: Zhonghao Shou, Seattle, WA (US)

( * ) Notice: Subject to any disclaimer, the term of this patent is extended or adjusted under 35 U.S.C. 154(b) by 0 days.

(21) Appl. No.: 13/020,564

(22) Filed: Feb. 3, 2011

(51) Int. Cl.
*G01V 1/28* (2006.01)

(52) U.S. Cl. .......... 702/2; 250/339.14; 702/15; 702/183

(58) Field of Classification Search ............ 702/15, 702/183, 2; 250/227.16, 253, 339.14; 324/348; 342/22

See application file for complete search history.

(56) References Cited

U.S. PATENT DOCUMENTS

| | | |
|---|---|---|
| 5,241,175 A | 8/1993 | Yasunaga |
| 5,387,869 A | 2/1995 | Enomoto |
| 5,694,129 A | 12/1997 | Fujinawa et al. |
| 6,246,964 B1 | 6/2001 | Blaunstein |
| 6,288,396 B1 * | 9/2001 | Qiang et al. ............ 250/339.14 |
| 6,763,306 B2 | 7/2004 | McGirr |
| 7,035,765 B2 * | 4/2006 | Tanahashi ................. 702/183 |
| 7,277,797 B1 * | 10/2007 | Kunitsyn et al. ............. 702/15 |
| 7,280,919 B2 | 10/2007 | Yomoda et al. |

OTHER PUBLICATIONS

Crider et al., "Kenya Air Flight 507 Vehicle Performance Study", DCA07RA040, Sep. 2007, 21 pgs.

Harrington, et al., "Bam Earthquake Prediction and Space Technology", Seminar documents, Seminars of the United Nations Programme on Space Applications, vol. 16, 2005, pp. 39-63.

Harrington, et al., "Bam Earthquake Prediction and Space Technology", retrieved on Oct. 13, 2010 at <<http://www.gisdevelopment.net/proceedings/tehran/p_session2/bampf.htm>>, Seminars of the United Nations Programme on Space Applications, vol. 16, 2005, pp. 39-63.

Shou, "Earthquake Clouds, a Reliable Precursor", retrieved on Oct. 13, 2010 at <<http://www.earthquakesignals.com/zhonghao296/A991003.html>>, Science and Utopya, vol. 64, Oct. 1999, pp. 53-57.

Shou, "Earthquake Vapor, a Reliable Precursor", Earthquake Predictions, Sep. 2006, pp. 21-51.

Shou et al., "Using the Earthquake Vapour Theory to Explain the French Airbus Crash", retrieved on Oct. 13, 2010 at <<www.earthquakesignals.com/zhonghao296/news.html>>, Taylor and Francis, Remote Sensing Letters, vol. 1, No. 2, Jun. 2010, pp. 85-94.

\* cited by examiner

*Primary Examiner* — John H Le
(74) *Attorney, Agent, or Firm* — Han IP Law PLLC; Andy M. Han

(57) ABSTRACT

The disclosed earthquake vapor theory, statistically significant in practice, overcomes two difficulties: the dependency on cold weather to pinpoint an earthquake epicenter and the time window not being short enough for evacuation. Finding a vapor nozzle based on boiling temperature can solve the former. Isolating the nozzle to find the next peak of daily maximum after vapor eruption can solve the latter by narrowing the time window to 1-2 days. The embodiments may also be utilized to prevent mysterious air and sea accidents.

18 Claims, 25 Drawing Sheets

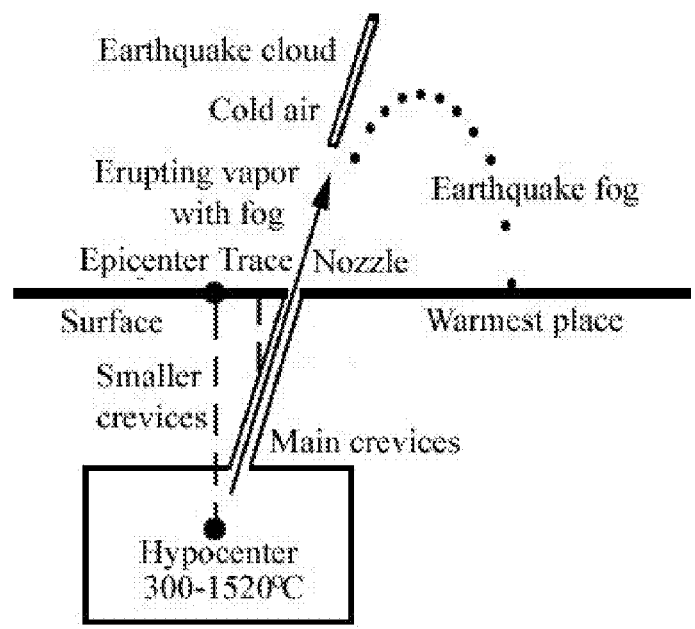
FIG. 1A
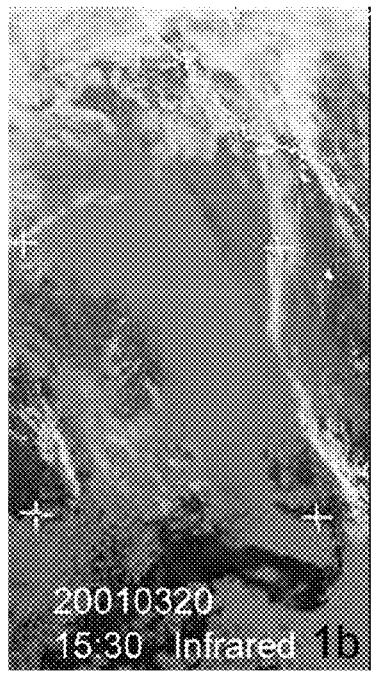 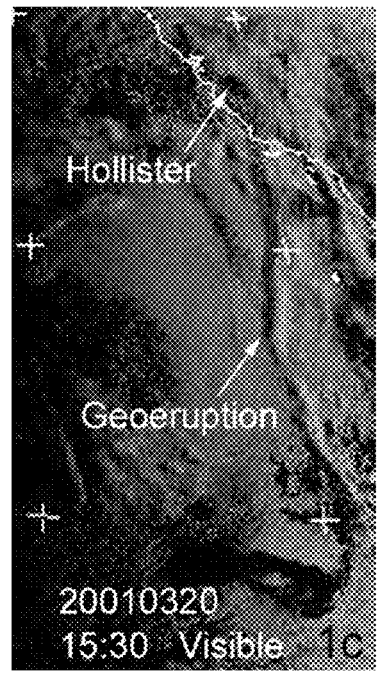
FIG. 1B    FIG. 1C

1300

1301

Detect, by a computing device, a presence of an earthquake vapor by comparing differences in intensity in a plurality of satellite infrared images taken under one or more wavelengths in a first range of 3.48 µm – 4.36 µm and under one or more wavelengths in a second range of 12.4 µm – 14.4 µm, or another range of wavelengths if it exists

1302

Disseminate information related to the earthquake vapor

FIG. 13

METHOD OF PRECISE EARTHQUAKE PREDICTION AND PREVENTION OF MYSTERIOUS AIR AND SEA ACCIDENTS

BACKGROUND

1. Technical Field

Various embodiments of the present disclosure relate to seismology and, more particularly, to methods of precise earthquake prediction and prevention of mysterious air and sea accidents.

2. Description of the Relevant Art

At present day, there exist a number of approaches to earthquake prediction. However, none of them is successful in practice except for the earthquake vapor theory by the inventor, Mr. Shou, of the present disclosure. For example, Shou predicted an earthquake of magnitude 5.5 or above in Bam, Iran within 60 days to the public at UTC 0:58 Dec. 25, 2003 by observation of an earthquake cloud. The observed cloud appeared suddenly from and instated in Bam for 24 hours on Dec. 20-21, 2003. A magnitude-6.8 devastating earthquake exactly that occurred at Bam on Dec. 26, 2003 proclaimed Shou's success as the only one in the predicted location and magnitude in history (Darrell Harrington & Zhonghao Shou, Bam Earthquake Prediction & Space Technology, *Seminars of the United Nations Programme on Space Applications,* 16, pp. 39-63, 2005).

Using satellite images to find an earthquake vapor, including an earthquake cloud and a geoeruption (appearance of a sudden cloudless space in an existing cloud), is similar to watching an image movie except that it entails staring at a fixed point to see if a vapor, e.g., an earthquake cloud, appears suddenly and becomes big enough. The earthquake cloud's tail points toward an impending epicenter. Its size predicts magnitude, as this is done by comparing the size of the earthquake cloud with those of similar formers whose relevant earthquakes in a database form a magnitude scale. The statistic delay from a vapor to its subsequent quake predicts the time of actual earthquake ranges between 1 and 112 days (the longest in over 500 events and 30 days on the average). This theory, however, has two difficulties. Firstly, it depends on cold weather to allow an observer to pinpoint an epicenter, e.g., the Bam cloud. Secondly, its time is not short enough for advance warning for evacuation. The present disclosure aims to resolve both of these issues.

In aviation, nobody has correctly explained mysterious crashes, which Shou et al. have explained the mysterious Air France crash scientifically (Zhonghao Shou, Jianjun Xia and Wenying Shou, Using the Earthquake Vapor Theory to Explain the French Airbus Crash, *Remote Sensing Letters,* 1:2, pp. 85-94, 2010). Inventor Shou has also checked more than 10 others including a sea accident, and discovered that all cases associated with sudden warm vapor. However, the theory needs a method to detect remote warm vapor automatically. The present disclosure also aims to resolve this issue.

SUMMARY

Various embodiments of the present disclosure rely on inventor Shou's earthquake vapor theory, statistically significant in practice, but overcome the two difficulties associated with the theory: the dependency on cold weather to pinpoint an earthquake epicenter and the time window not being short enough for evacuation. Finding a vapor nozzle based on boiling temperature can solve the former. Isolating the nozzle to find the next peak of daily maximum after vapor eruption can solve the latter by narrowing the time window to 1-2 days if the daily maximum reduces; otherwise, an impending earthquake can happen in the first three days with a possibility of about 10% (Zhonghao Shou. Earthquake Vapor, a reliable precursor. *Earthquake Prediction,* ed. Mukherjee, Saumitra. Brill Academic Publisher, Leiden-Boston, pp 21-51, 2006). The embodiments can also be utilized to prevent mysterious air and sea accidents.

In one aspect, a method of earthquake prediction is provided. The method comprises: identifying a geographic region having temperature abnormality caused by an earthquake vapor eruption; computing data related to an impending earthquake based at least in part on a comparison of data related to the identified geographic region and data related to reported earthquakes; locating a vapor nozzle of a hypocenter of the impending earthquake; and determining a location of an epicenter of the impending earthquake, a time of the impending earthquake, a magnitude of the impending earthquake, or a combination thereof, using the computed data or data related to the vapor nozzle, or both.

In one embodiment, identifying a geographic region having temperature abnormality may comprise identifying the geographic region having temperature abnormality using a plurality of satellite infrared images or one or more land temperature scanners.

Optionally, the method may further comprise using an infrared thermometer to aid locating the vapor nozzle in an event that one or more of the plurality of satellite infrared images have a low resolution or a low frequency.

Preferably, the plurality of satellite infrared images may comprise a plurality of satellite infrared images taken under one or more infrared wavelengths in a first range of 3.48 µm-4.36 µm, a second range of 12.4 µm-14.4 µm, or both, or another range of wavelengths.

In one embodiment, the computed data related to the impending earthquake may comprise a location of the vapor nozzle of the hypocenter of the impending earthquake, or the location of the vapor nozzle of the hypocenter and a magnitude of the impending earthquake.

In one embodiment, locating a vapor nozzle of a hypocenter of the impending earthquake may comprise locating the vapor nozzle of the hypocenter of the impending earthquake by using the computed data.

In one embodiment, locating a vapor nozzle of a hypocenter of the impending earthquake may comprise locating the vapor nozzle of the hypocenter of the impending earthquake by identifying a geographic location having exhibited a first temperature peak as the vapor nozzle.

Preferably, the first temperature peak may comprise a temperature of at least 100° C. or a lower but abnormal temperature.

Optionally, the method may also comprise monitoring temperature variations of the vapor nozzle to identify a second temperature peak that occurs after the first temperature peak. Optionally, the method may further comprise determining the time of the impending earthquake to be within a predetermined period of time from the second temperature peak.

In one embodiment, the method may further comprise establishing a database that stores the data related to reported earthquakes by: recalibrating a plurality of satellite infrared images of one or more areas of the earth where the reported earthquakes occurred to emphasize temperature of at least 100° C. or a lower but abnormal temperature in the images to provide a plurality of new images; computing a latitude and a longitude of a vapor nozzle of a respective hypocenter of each of the reported earthquakes, a respective area of temperature abnormality for each of the reported earthquakes, or both; and storing data of the latitude and longitude of the respective vapor nozzle of each of the reported earthquakes or the respective area of temperature abnormality of each of the reported earthquakes, or both, and a correlation between a respective magnitude of each of the reported earthquakes and the latitude and longitude of the respective vapor nozzle of each of the reported earthquakes or the respective area of temperature abnormality of each of the reported earthquakes, or both, in a database. For linear earthquake clouds, length of 300 km and 350 km predicts a magnitude of more than or equal to 6 and 7 respectively (Zhonghao Shou. Earthquake Vapor, a reliable precursor. Earthquake Prediction pp. 21-51 ed. Mukherjee Saumitra. Brill Academic Publisher, Leiden-Boston, 2006).

In one embodiment, the method may further comprise sending a warning signal in an event that the determined magnitude of the impending earthquake exceeds a threshold value.

In another aspect, a method of earthquake prediction is provided. The method comprises: monitoring temperature variations of a vapor nozzle of a hypocenter of an impending earthquake, the vapor nozzle having exhibited a first temperature peak of at least 100° C. or a lower but abnormal temperature; determining whether or not a trace of cloud above a region between the vapor nozzle and an epicenter of the impending earthquake warrants notification based on temperatures of the vapor nozzle and its surrounding; monitoring temperature variations of the vapor nozzle to identify a second temperature peak that occurs after the first temperature peak; and determining a location of an epicenter of the impending earthquake, a time of the impending earthquake, a magnitude of the impending earthquake, or a combination thereof, using data from a database that stores data related to earthquakes.

In one embodiment, the method may further comprise establishing a database that stores the data related to reported earthquakes by: recalibrating a plurality of satellite infrared images of one or more areas of the earth where the reported earthquakes occurred to emphasize temperature of at least 100° C. or a lower but abnormal temperature in the images to provide a plurality of new images; computing a latitude and a longitude of a vapor nozzle of a respective hypocenter of each of the reported earthquakes, a respective area, time, a highest temperature, an average increment of temperature abnormality for each of the reported earthquakes, or a combination thereof; and storing data of the latitude and longitude of the respective vapor nozzle of each of the reported earthquakes, the respective area, the time, the highest temperature, an average increment of temperature abnormality for each of the reported earthquakes, or a combination thereof, and a correlation between a respective magnitude of each of the reported earthquakes and the latitude and longitude of the respective vapor nozzle of each of the reported earthquakes, the respective area, the time, the highest temperature, the average increment of temperature abnormality for each of the reported earthquakes, or a combination thereof, in the database.

In one embodiment, the plurality of satellite infrared images may comprise a plurality of satellite infrared images taken under one or more infrared wavelengths in a first range of 3.48 µm-4.36 µm, a second range of 12.4 µm-14.4 µm, another range of wavelengths, or a combination thereof.

In one embodiment, the method may further comprise determining a magnitude of the impending earthquake by: detecting a presence of an earthquake vapor, the earthquake vapor comprising an earthquake cloud, a geoeruption manifested as a sudden cloudless space in an existing cloud, or both; computing data related to the earthquake vapor; and determining the magnitude of the impending earthquake by comparing the computed data related to the earthquake vapor with data stored in the database that is related to earthquake vapors of the reported earthquakes.

In yet another aspect, a method of prevention of mysterious air and sea accidents is provided. The method comprises: detecting, by a computing device, a presence of an earthquake vapor by comparing differences in intensity in a plurality of satellite infrared images taken under one or more wavelengths in a first range of 3.48 µm-4.36 µm, under one or more wavelengths in a second range of 12.4 µm-14.4 µm, or under another range of wavelengths; and disseminating information related to the earthquake vapor.

In one embodiment, the computing device may comprise a land-based computing device, and wherein disseminating information related to the earthquake vapor may comprise disseminating information related to the earthquake vapor to at least one vessel navigating within a predetermined distance of the earthquake vapor.

In one embodiment, the computing device may comprise a computing device on a vessel, and wherein disseminating information related to the earthquake vapor may comprise disseminating information related to the earthquake vapor to a pilot of the vessel, one or more other vessels, one or more land-based stations, or a combination thereof.

In one embodiment, the method may further comprise determining a distance between the earthquake vapor and a vessel; and at least one of the following: reorganizing a meteorological data record system and an analysis system in an airport to find earthquake vapor; modifying the meteorological data record system and the analysis system in the airplane to find earthquake vapor; or modifying a control system of an airplane to improve the airplane's ability against effect of earthquake vapor.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 1a is a schematic diagram of a developed model of the earthquake vapor theory according to the present disclosure.

FIGS. 1b and 1c are a satellite infrared image and a visual image, respectively, of the same geographic region at the same time.

FIG. 13 is a flowchart of a method of prevention of mysterious air and sea accidents in accordance with an embodiment of the present disclosure.

DETAILED DESCRIPTION

Overview

Figure 2B:
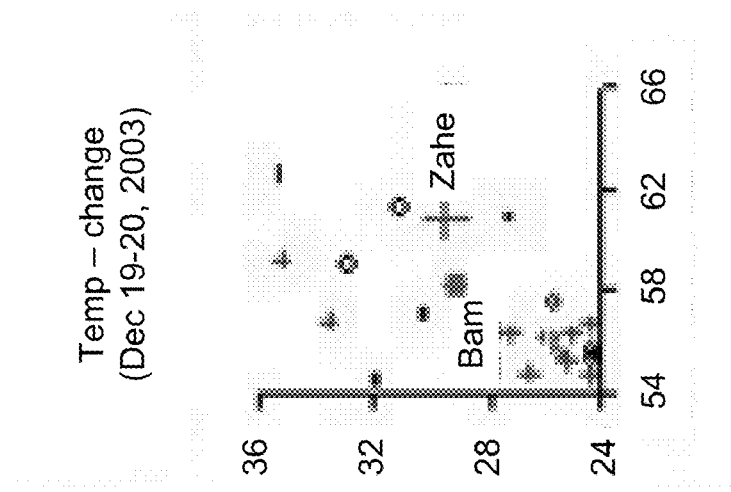
FIG. 2b is a chart of daily maximum temperature change at Zahedan on Dec. 19-20, 2003 when and where the Bam cloud was erupting nearby.

An earthquake vapor generally erupts suddenly from an impending hypocenter, at a temperature of 300-1520° C., through main crevices to a fixed vapor source (nozzle) on the earth's surface and rises up to the atmosphere. The hypocenter also emits vertically by crevices of various sizes to the earth's surface to form a detectable warm trace between the epicenter and the vapor nozzle. The article "Bam Earthquake Prediction & Space Technology" reports such an example, as shown in FIG. 7, and inventor Shou's No. 45 prediction verified by the USGS (United States Geological Survey) successfully. A vapor nozzle has sudden boiling temperature of at least 100° C. by which the nozzle can be found. Thus, the epicenter of an earthquake can be pinpointed independent of cold weather.

The vapor results in tiny drops of hot liquid (fog). The fog eventually lowers to near a location on the earth's surface to cause the location's daily maximum to rise up the most, e.g., Zahedan was such a place for the Bam cloud. Take Zahedan for example, the daily maximum temperature dropped after it peaked, and rose up again to another peak one day before the Bam earthquake. This property of earthquake occurring after the second temperature peak would be common within 1-2 days and useful for prediction if a vapor nozzle can be isolated to measure the daily maximum.

Images by different infrared channels show warm earthquake clouds near the time and space of the Air France Flight 447 crash with different shades of darkness or densities. This phenomenon can be used to detect remote warm vapor and thus prevent mysterious air and sea accidents automatically.

Earthquake Vapor Theory

FIG. 1*a* depicts a developed model of the earthquake vapor theory. Vapor erupts suddenly from an impending hypocenter, at a temperature of 300-1520° C., through main crevices to a fixed vapor nozzle on the earth's surface and then rises up. Upon encountering cold air in the atmosphere, the vapor forms an earthquake cloud, e.g., the Bam cloud, or dissipates part of an existing cloud to form a cloudless space. Such phenomenon is denoted as a geothermal eruption, or geoeruption, e.g., the geoeruption in Hollister, California (Harrington & Shou 2005). Although the vapor nozzle is the hottest place in a given geographic region and has sudden boiling temperature, there usually is not an observation station nearby unless the existence of the vapor nozzle is already known. Moreover, although vapor rises up, generally speaking the air has high thermal isolation. Additionally, observatories do not record data frequently. Thus, even if an observation is near a nozzle, such observation may not record the highest temperature. Moreover, even if an observation did record a boiling temperature, it can be deleted as a mistake. Practically, an observation station recording the highest temperature usually is located at a place where the fog lowers down in altitude. The epicenter is on the earth's surface and perpendicular to the hypocenter. The main crevice typically has tiny crevices above, through which a part of the vapor rises up slowly to form a warm trace between the epicenter and the vapor nozzle (Harrington & Shou 2005). As the vapor nozzle is usually close to the hypocenter, the trace is often short in distance.

FIG. 1*b* is a satellite infrared image and FIG. 1*c* is a visual image of the same geographic region at the same time of UTC 15:30 on Mar. 20, 2001 and at the same location, around Hollister (plotted), California. The visual image shows a clear black band or geoeruption from Hollister to the Pacific Ocean, while the infrared image does not. Inventor Shou made No. 50 prediction in Hollister to the USGS exactly (Harrington & Shou 2005). This comparison suggests visible wavelengths may be better than infrared wavelengths in detecting a vapor nozzle.

Other than wavelength, darkness calibration, pixel resolution and image frequency also substantially affect the detection of a vapor nozzle. Meteorological images typically focus on the normal temperature of about −40∼+50° C., while the focus needs to be on temperatures equal to or greater than 100° C. in order to detect a vapor nozzle. Satellite owners have images with very high resolution and high darkness calibration at an image frequency of 96 images per day, but offer to the public with images of low resolution (4 km/pixel) and low darkness calibration at a low image frequency (4-8 images per day). If more images per day with high resolution and high darkness calibration could be made available, it is possible to pinpoint a vapor nozzle more easily.

The Barn Earthquake

Figure 2A:
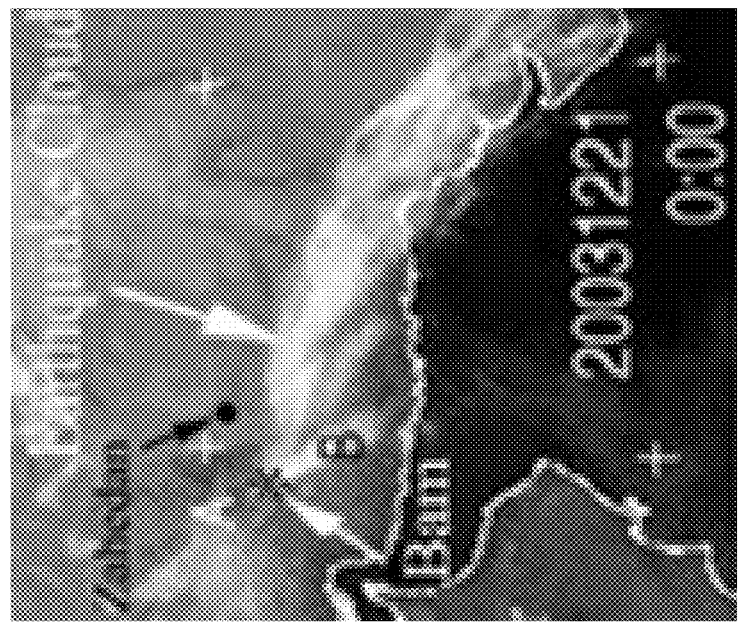
FIG. 2a is a satellite infrared image of a geographic region affected by the Bam earthquake.

FIG. 2*a* is a satellite infrared image of a geographic region affected by the Bam earthquake. FIG. 2*a* reveals the original Bam prediction image, by which inventor Shou predicted the Bam earthquake between point A and point B in the image successfully. The Bam epicenter (29.0N, 58,3E) and the Zahedan station (29.47N, 60.88E) are marked in the image of FIG. 2*a*.

FIG. 2*b* is a chart of daily maximum temperature change at Zahedan, and shows that daily maximum rose up the most (5° C.) at Zahedan from Dec. 19 to Dec. 20, 2003 when and where the Bam cloud was erupting nearby.

Figure 2C:
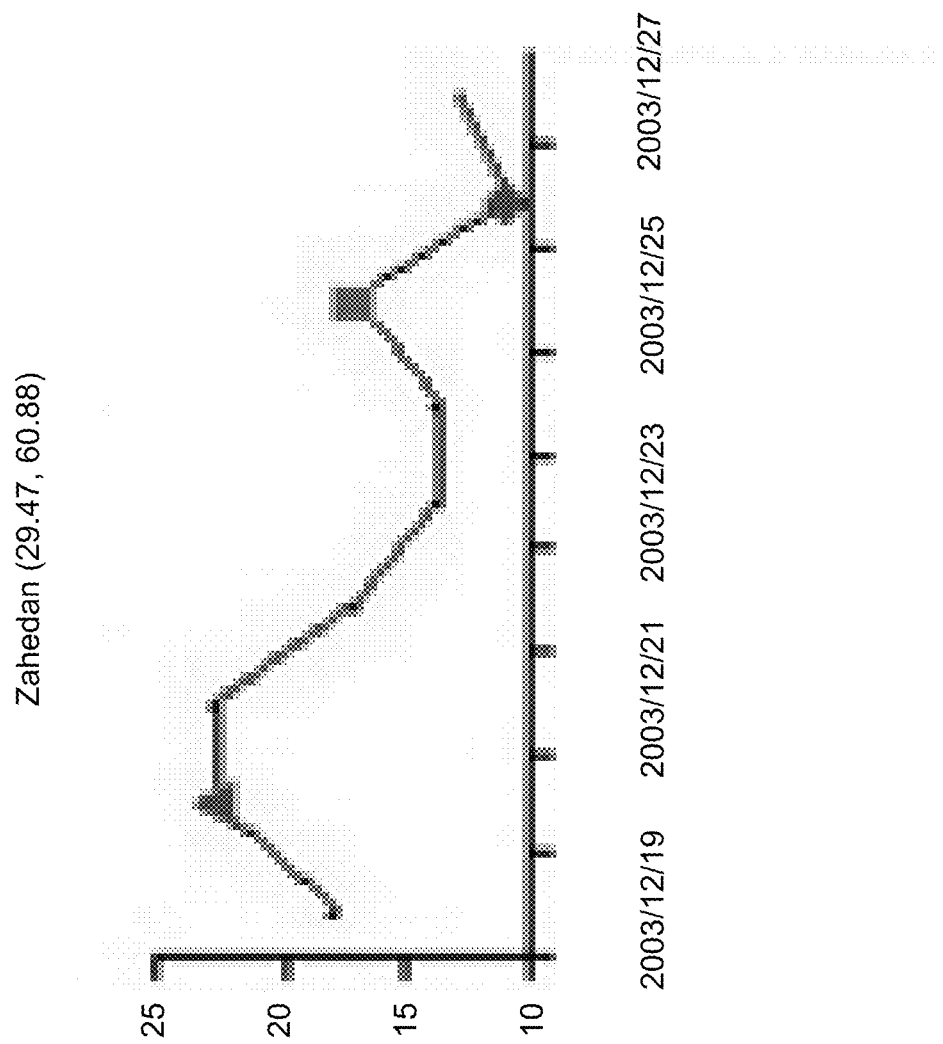
FIG. 2c is a chart of daily maximum temperature at Zahedan on Dec. 19-27, 2003.

FIG. 2*c* is a chart of daily maximum temperature at Zahedan on Dec. 19-27, 2003. In particular, the chart in FIG.

2c describes daily maximum temperature at Zahedan from Dec. 19, 2003 (one day before the cloud) to Dec. 27, 2003 (one day after the Bam earthquake). The characteristic curve reveals an increase, marked by a triangle, on Dec. 20, 2003 when the Bam cloud was erupting, a decrease after Dec. 21, 2003 and another increase, marked by a square, on Dec. 25, 2003 or one day before the Bam earthquake, marked by a circle. The triangle, square and circle indicate the date of vapor eruption, the date of the nearest temperature increase before the earthquake and the date of the earthquake, respectively.

Figure 2D:
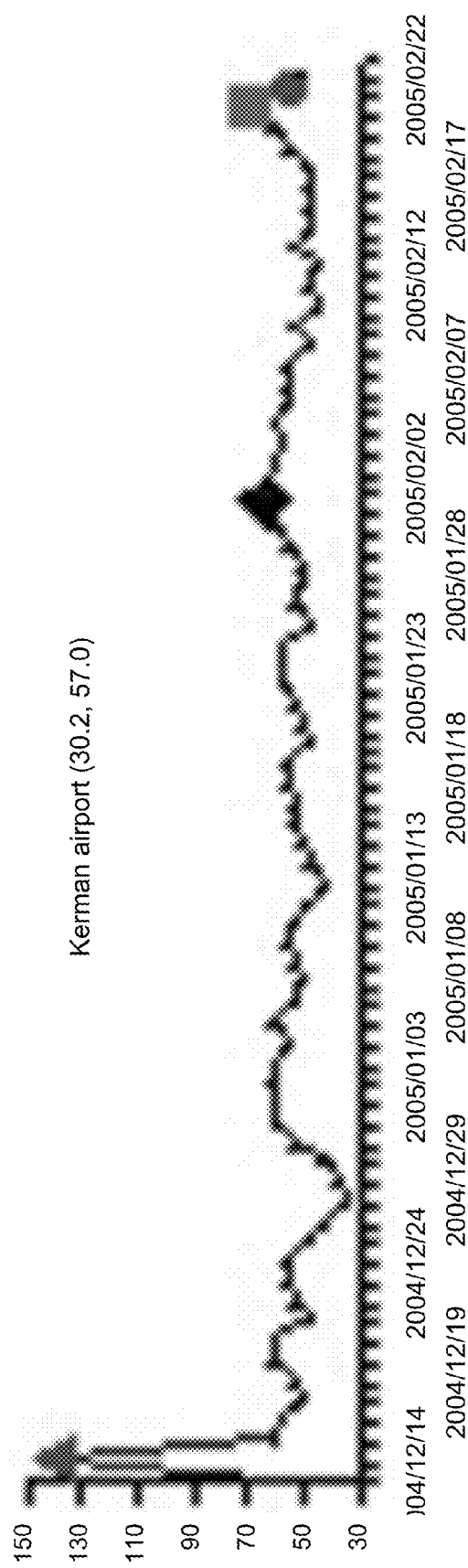
FIG. 2d is a chart of daily maximum temperature at Kerman airport.

FIG. 2d is a chart of daily maximum temperature at Kerman airport. The chart of FIG. 2d shows the same characteristics as that of FIG. 2c at the Kerman airport. The curve has additional ups and downs, due to other eruptions. For instance, the second highest peak (marked by a rhombus) was due to a geoeruption on Feb. 1, 2005 (see FIG. 2e). The circle indicates the M6.5 (magnitude-6.5) Kerman quake on Feb. 22, 2005.

Figure 2E:
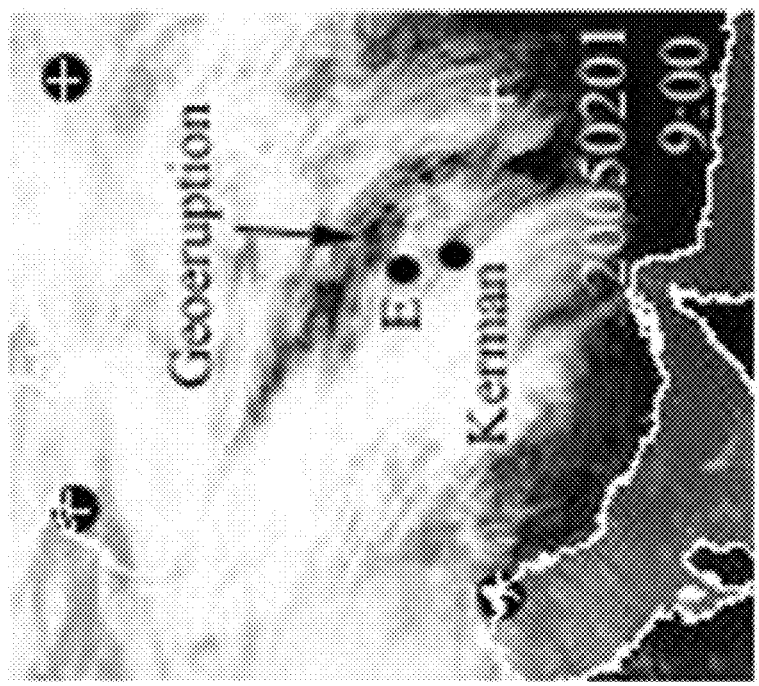
FIG. 2e is a satellite infrared image showing a geoeruption that caused the temperature marked by a rhombus in FIG. 2d.

FIG. 2e is a satellite infrared image showing a geoeruption that caused the temperature marked by a rhombus in FIG. 2d. The subsequence was an M4.2 quake at point E in the image (32.06N, 56.64E) on Feb. 26, 2005.

Figure 2F:
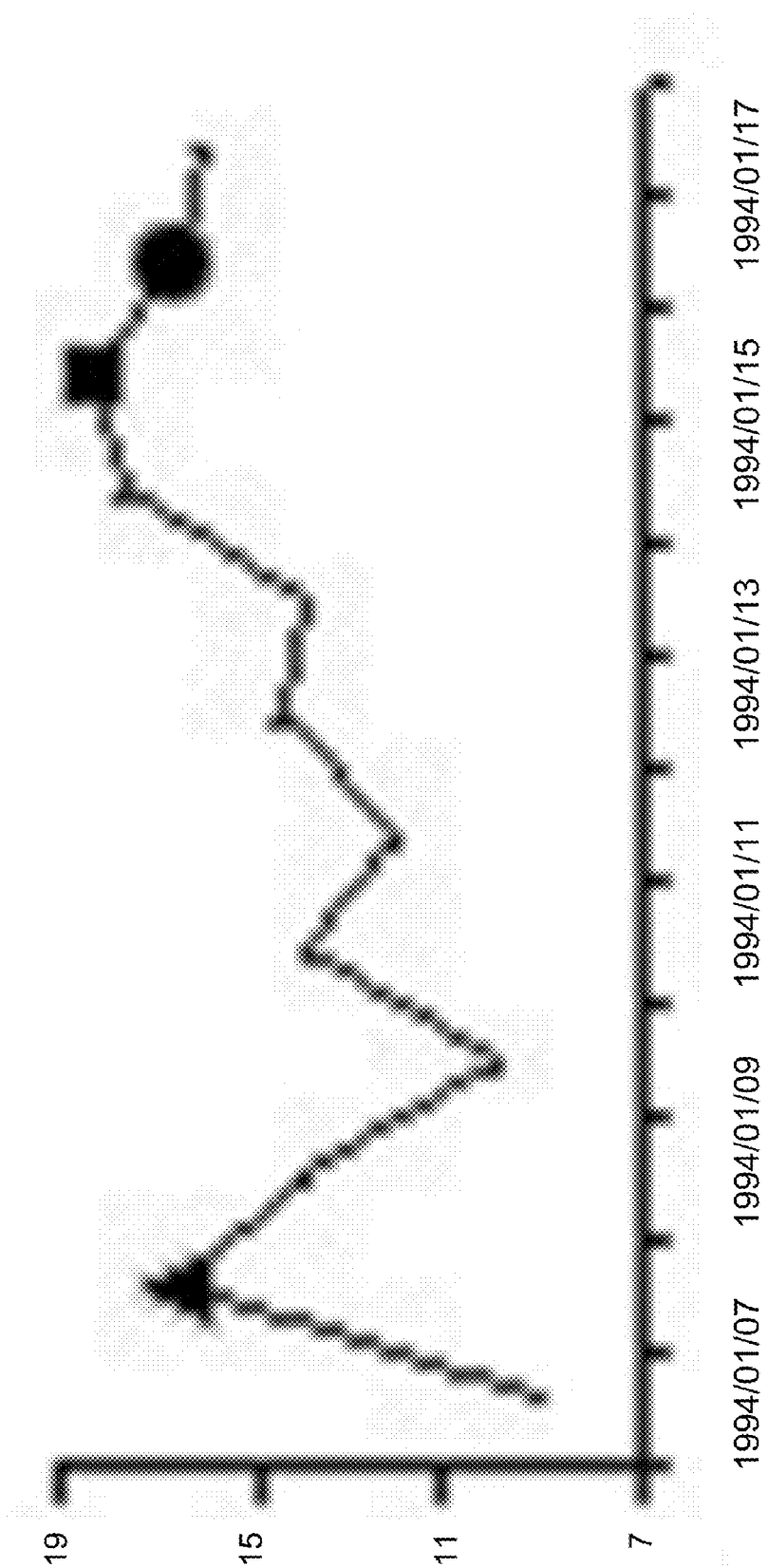
FIGS. 2f-2k each shows a chart of daily maximum temperature at a respective location over a period of time near the location and time of a respective earthquake.
Figure 2G:
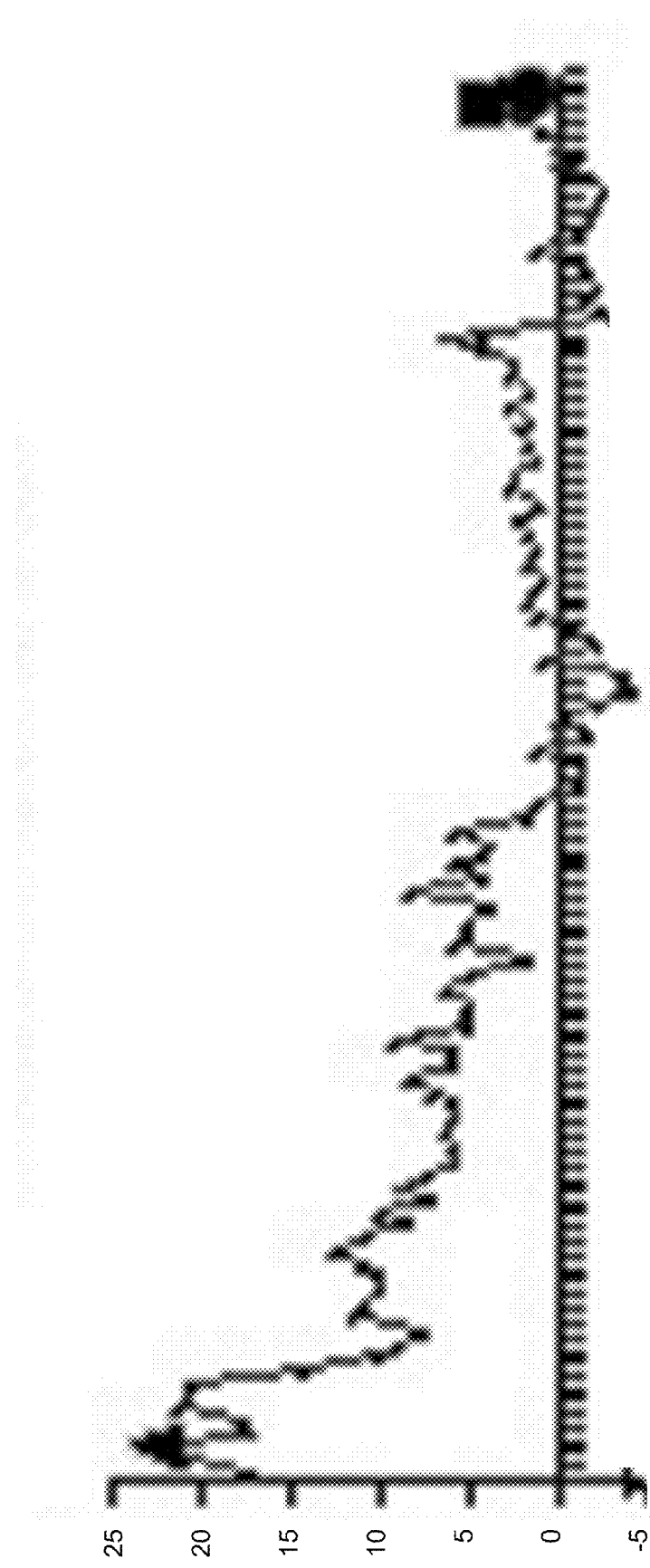
Figure 2H:
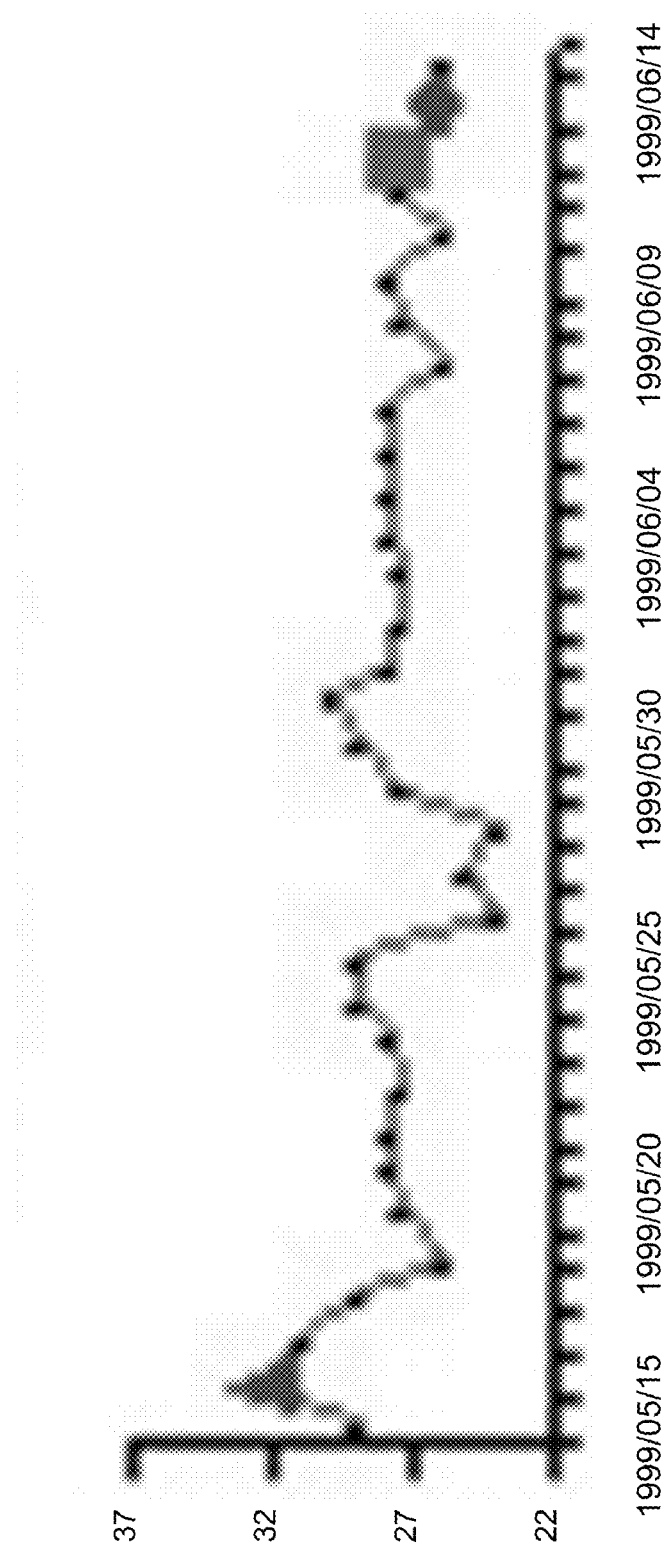
Figure 2I:
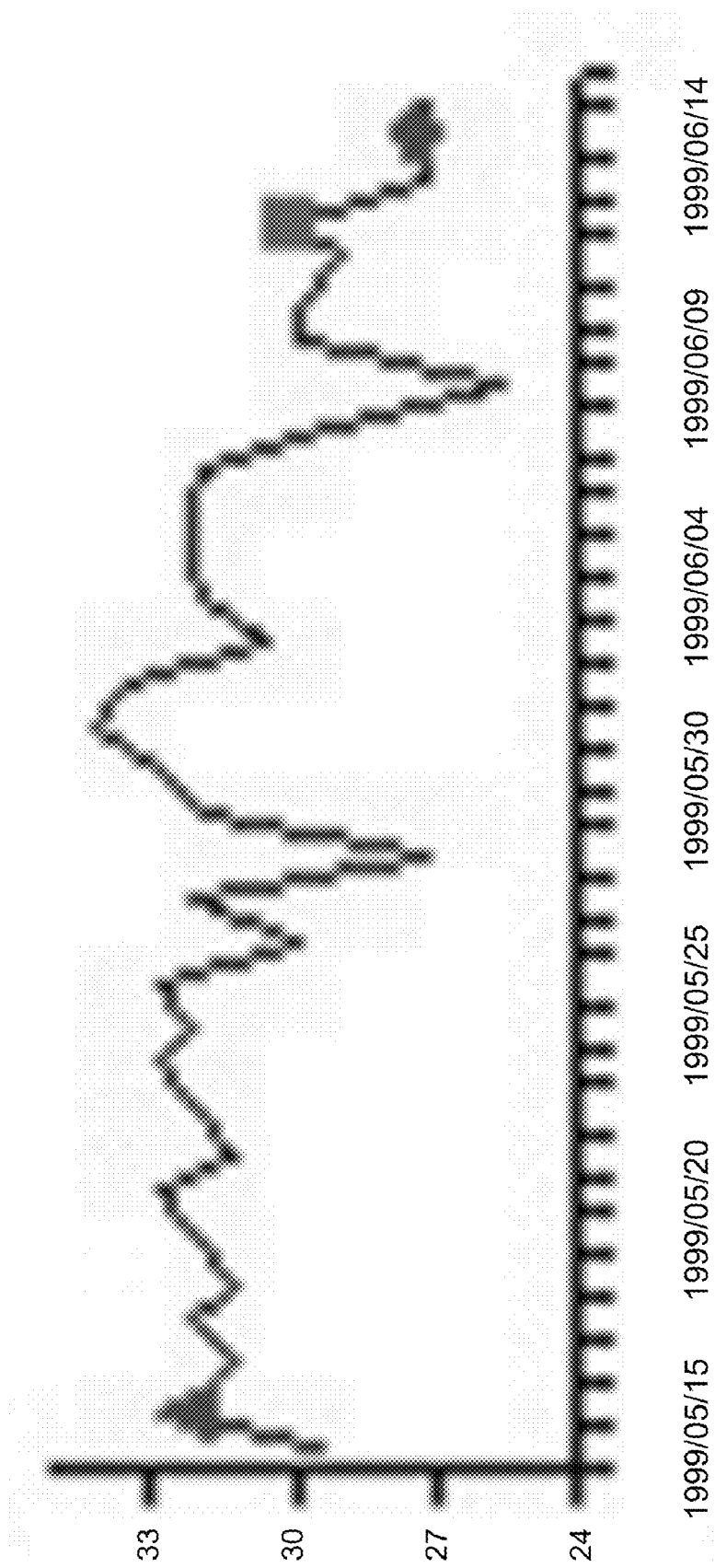
Figure 2J:
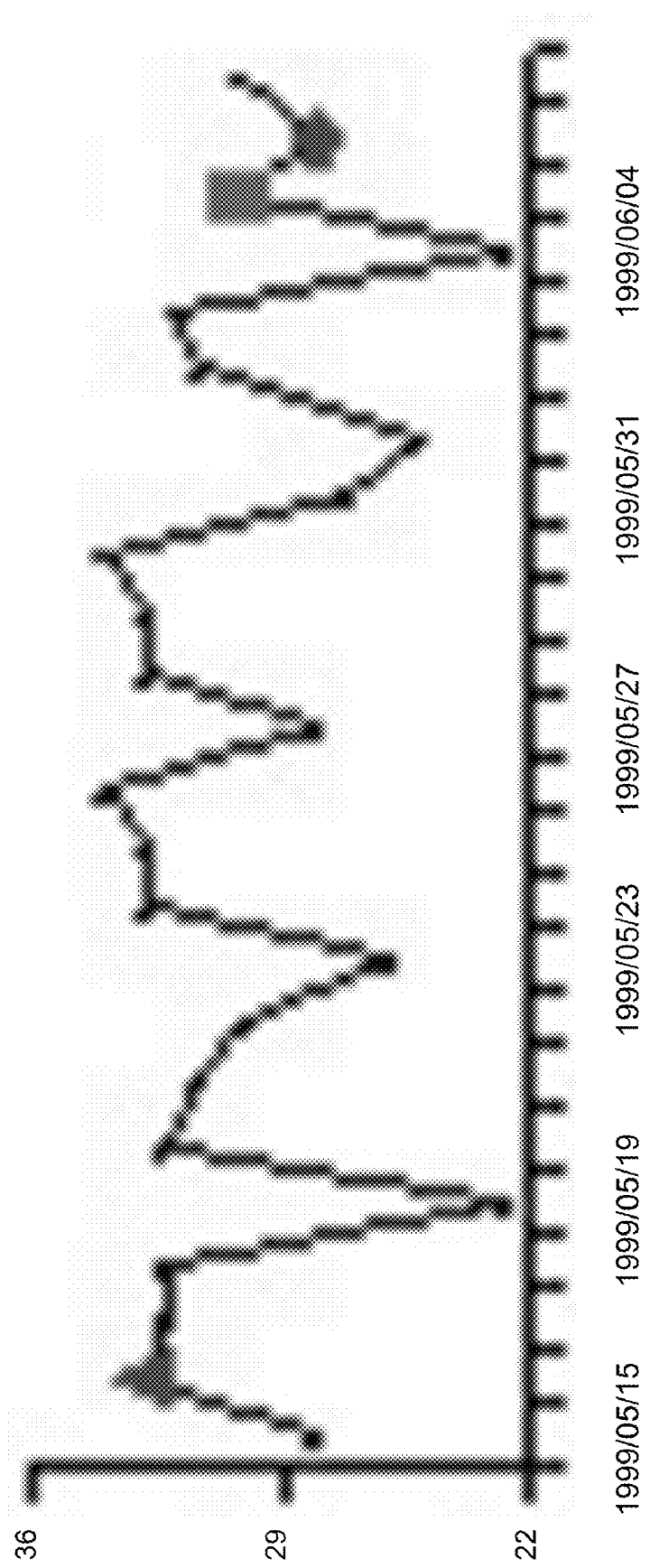
Figure 2K:
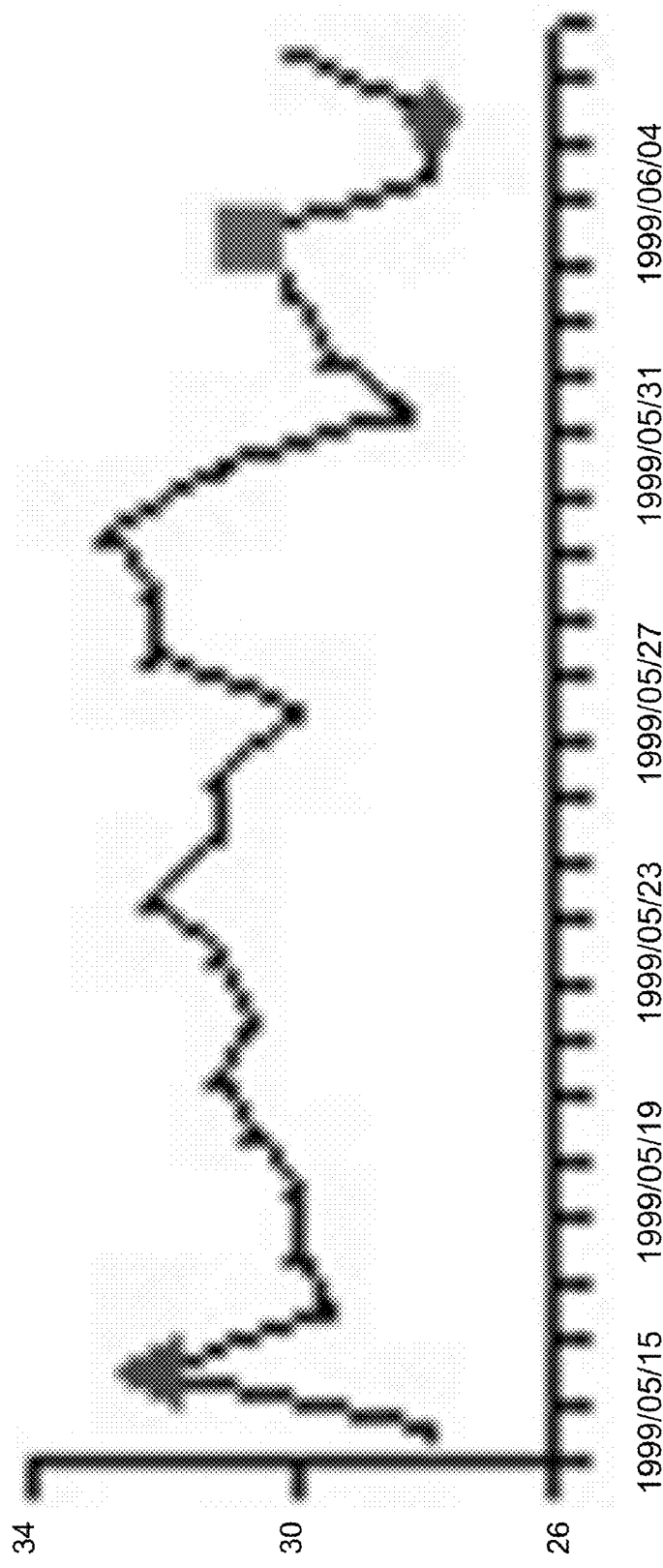

FIGS. 2f-2k each shows a chart of daily maximum temperature at a respective location over a period of time near the location and time of a respective earthquake. FIG. 2f is a chart of daily maximum temperature at the Sandber station (34.74N, 118.72W) for the M6.7 Northridge quake on Jan. 17, 1994. FIG. 2g is a chart of daily maximum temperature at the Shache station (38.43N, 77.27E) for the M6.2 Xinjiang quake on Feb. 14, 2005. FIG. 2h is a chart of daily maximum temperature at the Licenciado Benito station (19.43N, 99.07W) and FIG. 2i is a chart of daily maximum temperature at the Cuernavaca station (18.88N, 99.2W). Both are for the M7 Mexico quake on Jun. 15, 1999. FIG. 2j is a chart of daily maximum temperature at the San Salvador station (13.7N, 89.12W) and FIG. 2k is a chart of daily maximum temperature at the Santa Ana station (13.97N, 89.5W). Both are for the M6.3 Guatemala quake on Jun. 6, 1999.

As can be seen from these charts, there is a common property. Although the six earthquakes have different delays of 7-104 days between vapor eruption and the actual occurrence of the respective earthquake, they all exhibit a first temperature peak upon vapor eruption and a second temperature peak one or two days prior to the earthquake. Between the two temperature peaks, temperature may sometimes vary up and down. FIGS. 2d and 2e prove those ups and downs in temperature were due to other earthquakes nearby. Therefore, isolating a vapor nozzle to measure temperature would avoid those ups and downs in measured temperature and normalize the resultant temperature curves to resemble that of FIG. 2c. A time window would narrow to 1-2 days after the second temperature peak if the daily maximum reduces; otherwise, an impending earthquake can happen in the first three days with a possibility of about 10% (Shou. 2006).

The Air France Flight 447 Crash

Figure 3D:
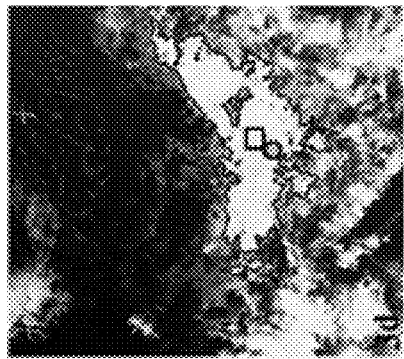
FIGS. 3a-3g show a series of MSG2 images around the time and location of the Air France Flight 447 crash over the mid-Atlantic Ocean on Jun. 1, 2009.
Figure 3C:
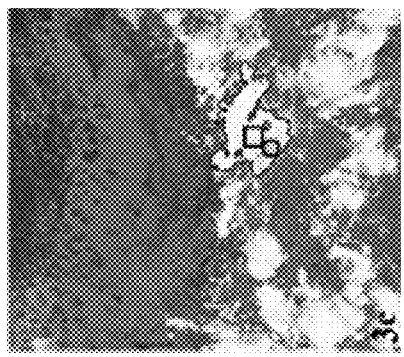
Figure 3B:
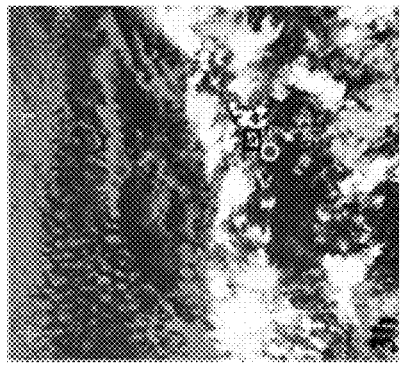
Figure 3A:
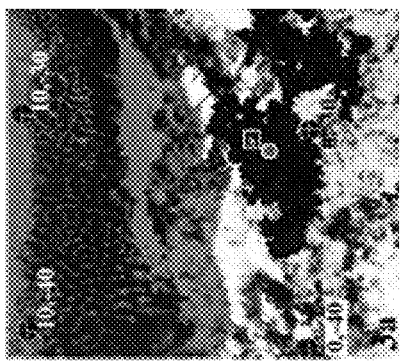
Figure 3G:
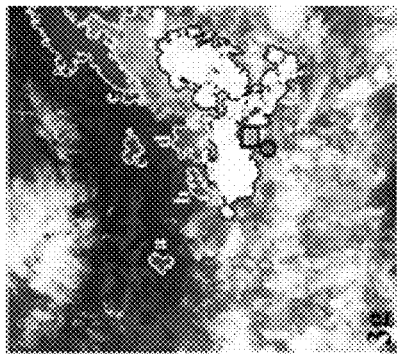
Figure 3F:
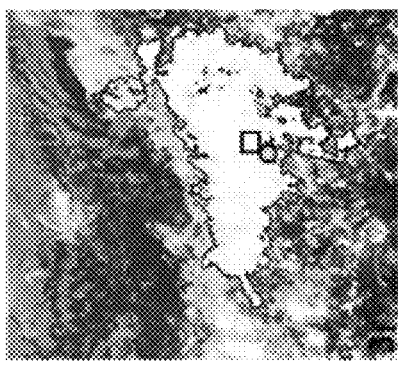
Figure 3E:
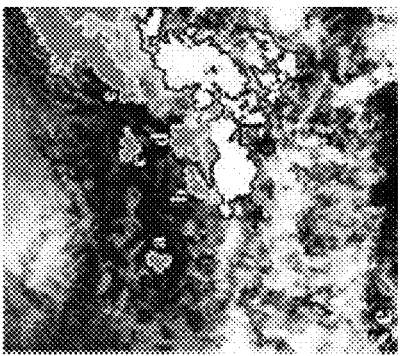

FIGS. 3a-3g show a series of MSG2 images around the time and location of the Air France Flight 447 crash over the mid-Atlantic Ocean on Jun. 1, 2009. The hollow circle indicates the place of the airbus at UTC 2:14 on Jun. 1, 2009 when the airbus sent an automated message indicating an electrical failure. The hollow square indicates the place at UTC 2:20 when the flight crew failed to make a scheduled contact with the Brazilian air controllers. No one knows the exact crash location, but can only estimate it to be somewhere between the circle and the square as shown in the images. FIGS. 3a-3f are from Channel 4 (wavelength 3.48-4.36 μm) at UTC 0:00, 6:00, 12:00 and 18:00 on May 31, 2009 and 0:00 and 6:00 on Jun. 1, 2009, respectively. They show that around the crash location, earthquake cloud (marked by a black edge) appeared suddenly and became bigger and higher. FIG. 3g is from Channel 11 (wavelength 12.4-14.4 μm) at UTC 0:00 on Jun. 1, 2009. The images of FIGS. 3e and 3g were taken at the same time and location, but under different wavelengths. It appears that, with wavelength 3.48-4.36 μm, clouds a, b, c, d and e (marked by a white edge) in FIG. 3e are whiter than those in FIG. 3g (taken under wavelength 12.4-14.4 μm). This phenomenon can be leveraged in detecting remote warm earthquake vapors to alert vessels to avoid mysterious air or sea accidents caused by earthquake vapor.

The Iran B727 Crash

Figure 4A:
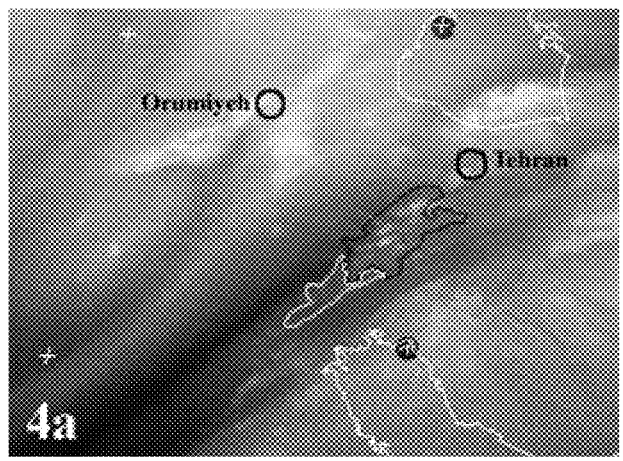
FIGS. 4a-4c show a series of three 6-hourly IODC images around the time and location of the Iran B727 crash in Orumiyeh on Jan. 9, 2011.
Figure 4B:
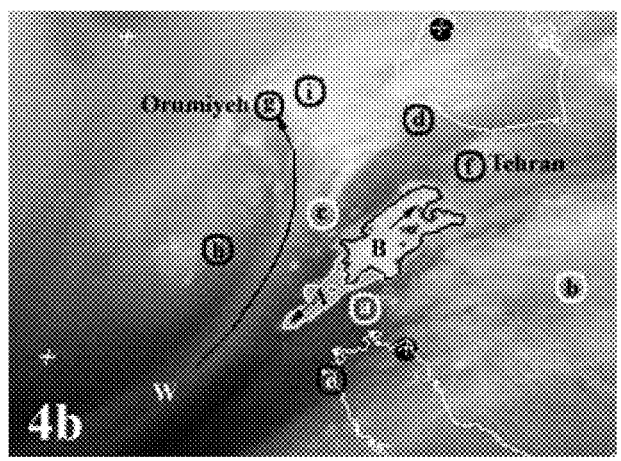
Figure 4C:
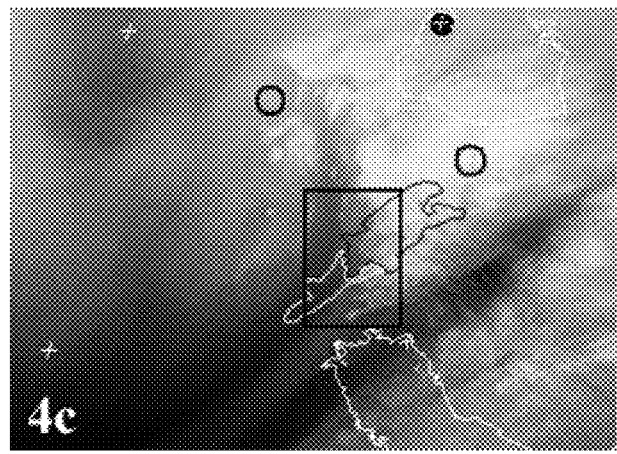

FIGS. 4a-4c show a series of three 6-hourly Meteosate IODC images around the time and location of the Iran B727 crash in Orumiyeh at UTC 16:15 on Jan. 9, 2011.

The image of FIG. 4a, taken at UTC 6:00, reveals no cloud in the white edge area and a few tiny clouds in the black edge area. The image of FIG. 4b, taken at UTC 12:00, shows that Cloud A appeared suddenly in the white edge area and southwestward against the direction of normal weather cloud, indicative of it being an earthquake cloud. Simultaneously, a part of this earthquake cloud rose up to form Cloud B in the black edge area suddenly and northeastward to follow the direction of normal weather cloud. Heat of Cloud A affected its surroundings strongly. Airports around this earthquake cloud are plotted by hollow circles of black edge and white edge with sign from 'a' to 'i', whose daily maximum temperature changes from January 8 to January 9 are shown in Table 1 below. The colors black and white indicate minus change and plus change or no change respectively. Airport 'a' (Ahwaz) was in downwind and increased 2° C. as the highest. Weather Cloud W spun from southwest to northeast and brought a part of Cloud A that resulted in no temperature change at Airport 'c' (Kermanshah). Afterwards, Cloud W went to 'g' (Orumiyeh). The image of FIG. 4c, taken at UTC 18:00, shows that Cloud A disappeared or combined with Clouds W and B northwestward and crashed flight B727 at UTC 16:15. FIG. 4c has an estimated rectangle where inventor Shou predicted one or more moderate earthquakes (of magnitudes 4-5.9) within 112 days before or on May 1, 2011.

TABLE 1

Daily maximum temperature change in Iran from Jan. 8 to Jan. 9, 2011

| Sign | Airport | Latitude (° N) | Longitude (° E) | Maximum change (° C.) |
|---|---|---|---|---|
| a | Ahwaz | 31.3 | 48.7 | 2 |
| b | Yazd | 31.9 | 54.3 | 1.7 |
| c | Kermanshah | 34.3 | 47.1 | 0 |
| d | Rasht | 37.2 | 49.6 | −1 |
| e | Kuwait | 29.2 | 48 | −2 |
| f | Tehran | 35.7 | 51.3 | −2.3 |
| g | Orumiyeh | 37.7 | 45 | −3 |
| h | Baghdad | 33.2 | 44.2 | −3 |
| i | Tabriz | 38.1 | 46.3 | −4 |

Temperature Abnormality

Before describing embodiments of the present disclosure, the definition of "temperature abnormality" is provided herewith. In the present disclosure, temperature abnormality means: (1) air temperature reaches or surpasses 60° C. (the highest in meteorology); (2) when the trend in hourly temperatures have a pulse increase denoted by point H in FIG. 5a; (3) when a daily maximum on a day reaches the highest in a month as denoted by point D in FIG. 5b; (4) when the daily maximum on a day reaches or surpasses others on the same day in many years as denoted by point D1 in FIG. 5c; (5) the daily maximum on a day is the second highest when the first highest is proved by earthquake vapor as denoted by point D2 in FIG. 5c; (6) the daily maximum increase is much higher than its surrounding such as the increase of 5° C. at Zahedan as shown in FIG. 2c.

Figure 5A:
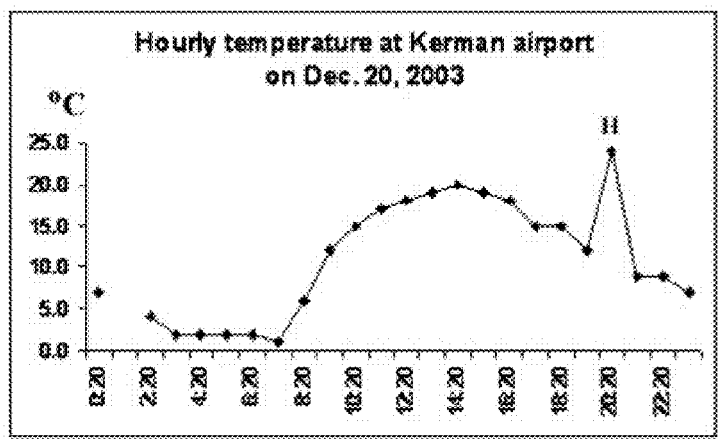
FIG. 5*a* shows the hourly temperatures at Kerman airport on Dec. 20, 2003.

FIG. 5a shows the hourly temperatures at Kerman airport on Dec. 20, 2003. The point H shows a pulse temperature increase from 12° C. at local time 19:20 to 24° C. at 20:20, followed by a decrease to 9° C. at 21:20 when a wind brought a part of the Bam cloud to the Kerman airport.

Figure 5B:
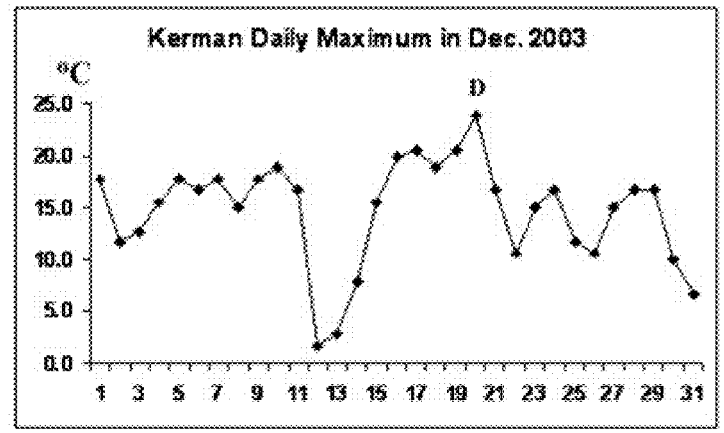
FIG. 5*b* shows the daily maximum temperature at Kerman airport in December 2003.

FIG. 5b shows the daily maximum at Kerman airport in December 2003. Point D shows a temperature increase from 20.6° C. on December 19, before the Bam cloud, to 24° C., the highest in the month, on December 20 when the Bam cloud was erupting, followed by a decrease to 16.7° C. on December 21 after the Bam cloud.

Figure 5C:
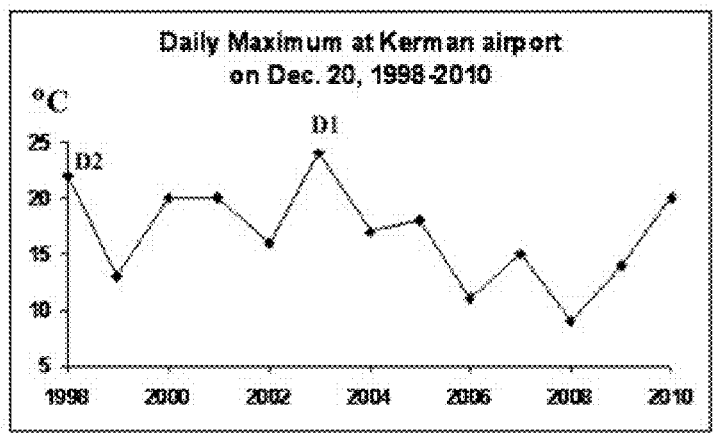
FIG. 5*c* shows the daily maximum temperature at Kerman airport on the date of December 20 in the years of 1998 to 2010.

FIG. 5c shows the daily maximum at Kerman airport on the date December 20 of various years, from 1998 to 2010. As shown, the highest temperature of 24° C. occurred in 2003 and is marked by point D1. The second highest temperature of 21.6° C. occurred in 1998 and is marked by point D2.

Figure 6:
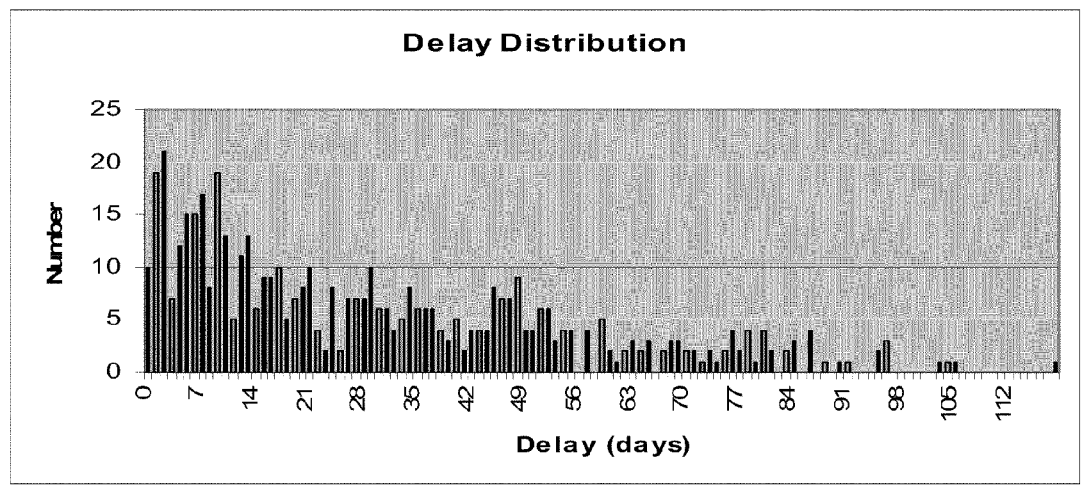
FIG. 6 shows a distribution of number of days between vapor eruption and the corresponding earthquake.

FIG. 6 shows a delay distribution (Shou 2006). The horizontal axis indicates the number of days of delay, and the vertical axis indicates the number of events having a particular number of days of delay. Among 509 events, the average delay and the longest delay between a vapor eruption and the corresponding earthquake is 30 days and 118 days, respectively. Considering earthquake data loss and the big gap between the longest and its next, Shou selected a reliable delay of 112 days as the longest delay.

Figure 7A:
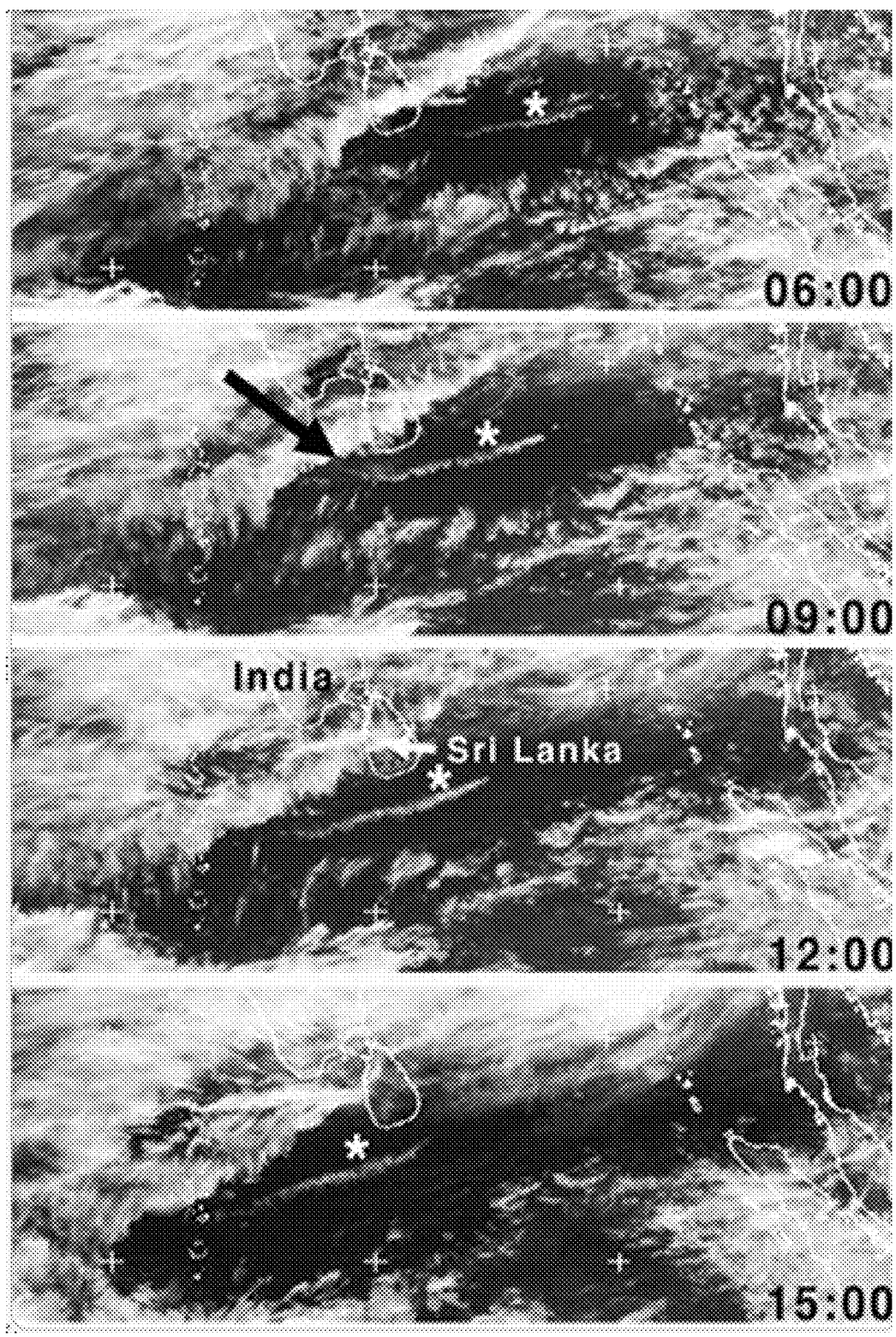
FIG. 7*a* shows an earthquake cloud of 800 km in length near Sri Lanka from 6:00 to 15:00 on Jul. 16, 1999.

An example of using recorded abnormal temperature to narrow predicted area is provided herewith. FIG. 7a shows an earthquake cloud of 800 km in length near Sri Lanka from 6:00 to 15:00 on Jul. 16, 1999. Based on this, Shou had known "an impending earthquake of magnitude over 7 from Iran to Italy within 49 days following 16 Jul. 1999, . . . however, he did not know the exact epicenter until the 7.8 Turkey earthquake on 17 Aug. 1999, because the images did not show from the cloud's origin" (Harrington and Shou 2005). This earthquake was the only one of magnitude more than or equal to 7 in the area of 0-90N and 0-100E within 530 days from May 31, 1998 to Nov. 11, 1999. On the other hand, FIG. 7b and Table 2 below reveal a comparison: all airports in Turkey lost temperature data coincidentally with the time of the cloud, while this was not the case outside of Turkey. The incomplete data in Adana (e), Dalaman (f) and Antalya (g) on July 14, as shown in Table 2, show temperature reaching or surpassing each highest daily maximum on the same day in the records of 15 years. Moreover, many Turkish people wrote Shou that those days had been extremely hot and even at the hottest in 60 years at least. The above facts suggest those data losses were because of temperature being too abnormal to record and the cloud moving from Turkey to Sir Lanka. Both the data loss distribution in FIG. 7b and moving direction of the cloud from northwest to southeast further suggest the epicenter in the northwest corner among Izimi (a), Istanbul (b), Ankara (c), Balikesir (h) and Eskisehir (1). This analysis greatly reduces the size of the predicted area to support the theory and innovative techniques described in the present disclosure. The Turkey Earthquake of Aug. 17, 1999

FIG. 7a shows the M7.8 Turkey earthquake clouds. These infrared images were from Satellite IODC from 6:00 to 15:00 on Jul. 16, 1999. At 6:00, a linear cloud appeared in a large clear sky near Sri Lanka. The cloud lengthened as it moved eastward, and then disappeared after 15:00. The length of the cloud, 800 km, suggested an earthquake of magnitude over 7. The tail (as shown in the 9:00 infrared image) pointed to the northwest, and indicated that the epicenter would be in a region from Iran to Italy. However, the satellite images did not show the exact epicenter, and Shou did not know it until Aug. 17, 1999 when the M7.8 Turkey earthquake happened at 40.74N, 29.86E (Harrington and Shou 2005).

Figure 7B:
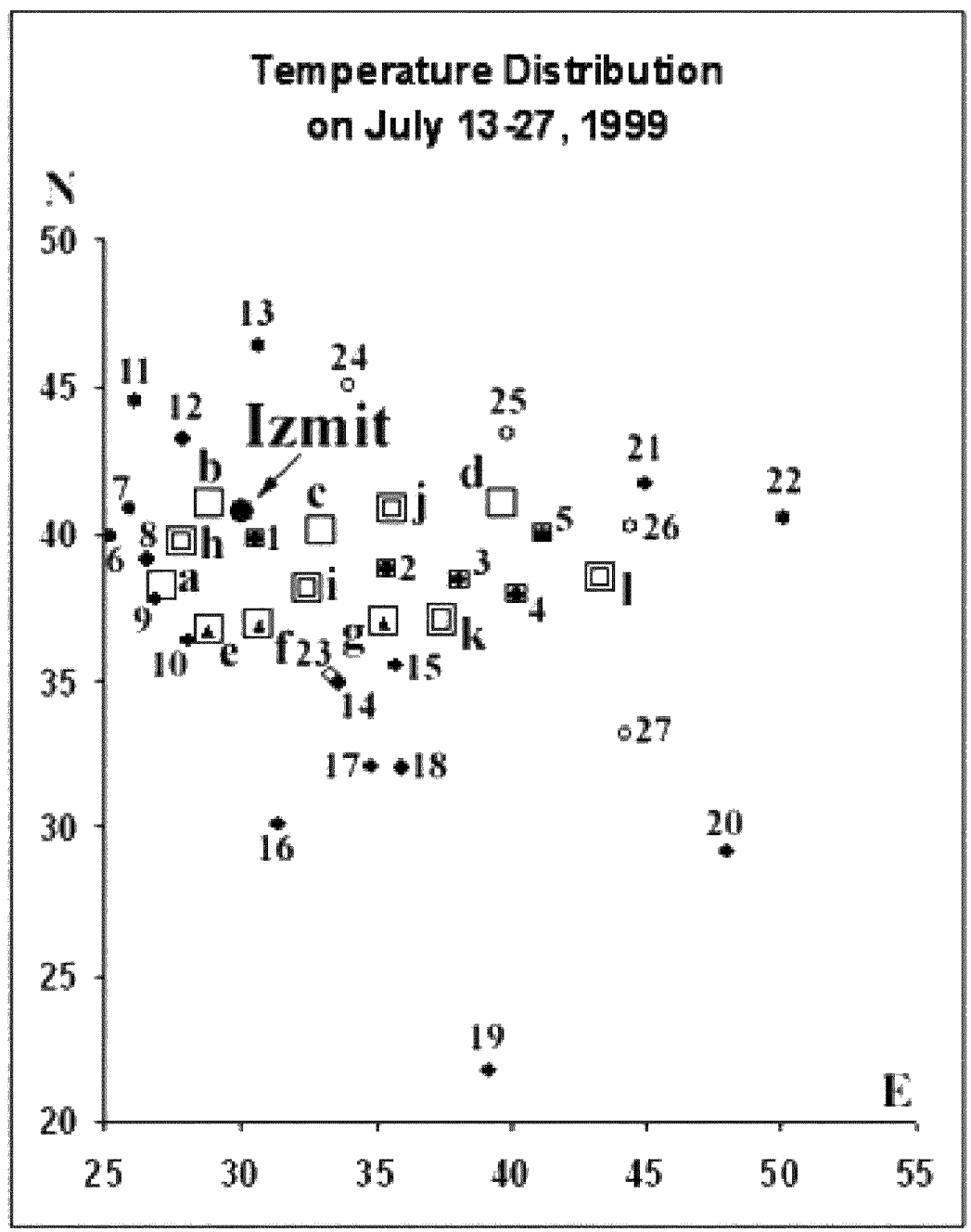
FIG. 7*b* shows a temperature distribution around the location and time of the Izimi earthquake cloud on Jul. 16, 1999.

FIG. 7b shows temperature distribution around the location and time of the Izimi earthquake cloud on Jul. 16, 1999. The biggest black solid circle indicates the M7.8 Izimi epicenter. Bigger black hollow squares marked by letters 'a' through 'l' indicate those airports in Turkey that lost many records of hourly temperature records on Jul. 13, 1999 coincidentally. Airports marked by 'a' through 'g' recovered their daily records afterwards. Small black solid triangles of airports marked by 'e' through 'g' show the highest daily maximum on Jul. 14, 1999 in 15 years from 1996 to 2010. Small black solid circles marked by numbers '1' through '5' indicate those airports in Turkey that did not lose hourly temperature records on Jul. 13, 1999. Smaller black hollow squares marked by letters 'h' through 'l' and numbers '1' through '5' indicate no temperature record on July 14-27 coincidentally. Small black solid circles marked by numbers '6' through '22' indicate those airports near Turkey that did not lose hourly temperature records. Small hollow circles marked by numbers '23' through '27' indicate those airports that have no data then.

TABLE 2

Temperature distribution around Izimi before and after an earthquake cloud on Jul.16, 1999

| Label | Airport | Country | Latitude | Longitude | Jul. 13 | Jul. 14 | Jul. 15-27 |
|---|---|---|---|---|---|---|---|
|  | Izmit | Turkey | 40.7 | 29.86 | M7.8 |  |  |
| a | Izmir | Turkey | 38.3 | 27.1 | Loss | Yes | Yes |
| b | Istanbul | Turkey | 41 | 28.8 | Loss | Yes | Yes |
| c | Ankara | Turkey | 40.1 | 33 | Loss | Yes | Yes |
| d | Trabzon | Turkey | 41 | 39.7 | Loss | Yes | Yes |
| e | Adana | Turkey | 37 | 35.3 | Loss | Highest | Yes |
| f | Dalaman | Turkey | 36.7 | 28.8 | Loss | Highest | Yes |
| g | Antalya | Turkey | 36.9 | 30.7 | Loss | Highest | Yes |
| h | Balikesir | Turkey | 39.6 | 27.9 | Loss | Loss | Loss |
| i | Konya | Turkey | 38 | 32.5 | Loss | Loss | Loss |
| j | Merzifon | Turkey | 40.8 | 35.6 | Loss | Loss | Loss |
| k | Gaziantep | Turkey | 37.1 | 37.4 | Loss | Loss | Loss |
| l | Van | Turkey | 38.5 | 43.3 | Loss | Loss | Loss |
| 1 | Eskisehir | Turkey | 39.8 | 30.6 | Yes | Loss | Loss |
| 2 | Kayseri | Turkey | 38.8 | 35.4 | Yes | Loss | Loss |
| 3 | Malatya | Turkey | 38.4 | 38.1 | Yes | Loss | Loss |
| 4 | Diyarbakir | Turkey | 37.9 | 40.2 | Yes | Loss | Loss |
| 5 | Erzurum | Turkey | 40 | 41.2 | Yes | Loss | Loss |
| 6 | Limnos | Greece | 39.9 | 25.2 | Yes | Yes | Yes |
| 7 | Alexandroupoli | Greece | 40.8 | 25.9 | Yes | Yes | Yes |
| 8 | Mytilini | Greece | 39.1 | 26.6 | Yes | Yes | Yes |
| 9 | Samos | Greece | 37.7 | 26.9 | Yes | Yes | Yes |
| 10 | Rhodes | Greece | 36.4 | 28.1 | Yes | Yes | Yes |
| 11 | Bucuresti | Romania | 44.5 | 26.1 | Yes | Yes | Yes |
| 12 | Varna | Bulgaria | 43.2 | 27.9 | Yes | Yes | Yes |
| 13 | Odesa | Ukraine | 46.4 | 30.7 | Yes | Yes | Yes |
| 14 | Larnaca | Cyprus | 34.9 | 33.6 | Yes | Yes | Yes |
| 15 | Lattakia | Syria | 35.5 | 35.8 | Yes | Yes | Yes |
| 16 | Cairo | Egypt | 30.1 | 31.4 | Yes | Yes | Yes |
| 17 | Tel Aviv-Yafo | Israel | 32.1 | 34.8 | Yes | Yes | Yes |
| 18 | Queen Alia | Jordan | 32 | 36 | Yes | Yes | Yes |
| 19 | Jeddah | Saudi Arabia | 21.7 | 39.2 | Yes | Yes | Yes |
| 20 | Kuwait | Kuwait | 29.2 | 48 | Yes | Yes | Yes |
| 21 | Tbilisi | Georgia | 41.7 | 45 | Yes | Yes | Yes |
| 22 | Baku | Azerbaijan | 40.5 | 50.1 | Yes | Yes | Yes |
| 23 | Nicosia | Cyprus | 35.2 | 33.4 | No | No | No |

TABLE 2-continued

Temperature distribution around Izimi before and after an earthquake cloud on Jul.16, 1999

| Label | Airport | Country | Latitude | Longitude | Jul. 13 | Jul. 14 | Jul. 15-27 |
|---|---|---|---|---|---|---|---|
| 24 | Simferopol | Ukraine | 45 | 34 | No | No | No |
| 25 | Sochi | Russia | 43.4 | 39.9 | No | No | No |
| 26 | Zvartnots | Armenia | 40.2 | 44.4 | No | No | No |
| 27 | Baghdad | Iraq | 33.2 | 44.2 | No | No | No |

The Ethiopian Boeing 737-800 Crash

An Ethiopian Boeing 737-800 took off from Beirut at UTC 0:35 on Jan. 25, 2010, or local time 2:35 a.m., to Addis Ababa-Bole, deviated from its normal route, lost contact with controllers and crashed into the Mediterranean Sea near Naameh about 1-2 minutes later. Simultaneously, many earthquake vapors erupted in Turkey and Greece at about UTC 18:00 on Jan. 24, 2010 southeastward together (see FIGS. 8a-8e). The heat of the vapors caused abnormal temperature rise. For example, almost all of the airports around the East Mediterranean Sea experienced pulse-like temperature increases at night between Jan. 24 and 25, 2010. In Lattakia (v) near Beirut (u) (see FIG. 8e), temperature increased 2° C. from 10° C. at local time 1:00 a.m. on January 25 to 12° C. at 2:00 a.m., and then lowered to 10° C. again. Another increase of 1° C. occurred from 11° C. at 3:00 a.m. to 12° C. at 4:00 a.m., and then to 11° C. at 5:00 a.m. In Beirut, there were no data at local time 12:00 p.m., 1:00 a.m., 3:00 a.m. and 4:00 a.m. on January 25, but there was an abnormal temperature increase of 1° C. at 11:00 p.m. on January 24. Moreover, its daily maximum only reached −1° C. from January 24 to January 25, while its neighborhoods reached −2° C., −3° C., −4° C. and −5° C. at Tel Aviv (r), Lattakia (v), Larnaca (ac) and Damascus (t), respectively. Earthquake vapor formed warm humidity currents that moved southeastward and caused strong anticlockwise currents at UTC 0:00 on January 25 that hit the airplane, made the airplane deviate from its route and crash at UTC 0:35 coincidentally.

Figure 8A:
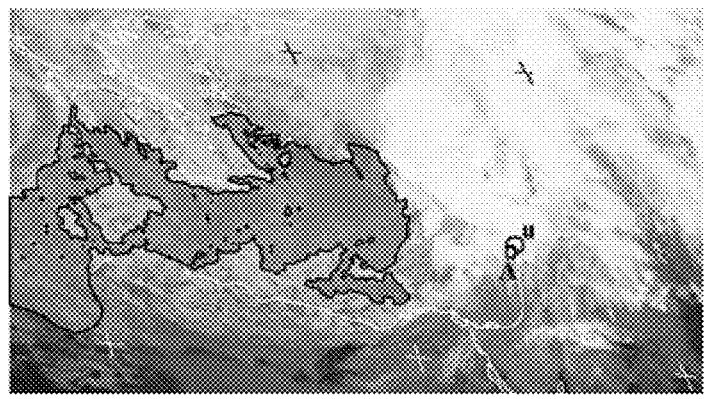
FIGS. 8*a*-8*e* show a series of infrared images covering a region where the Ethiopian flight crash of Jan. 25, 2010 occurred.
Figure 8B:
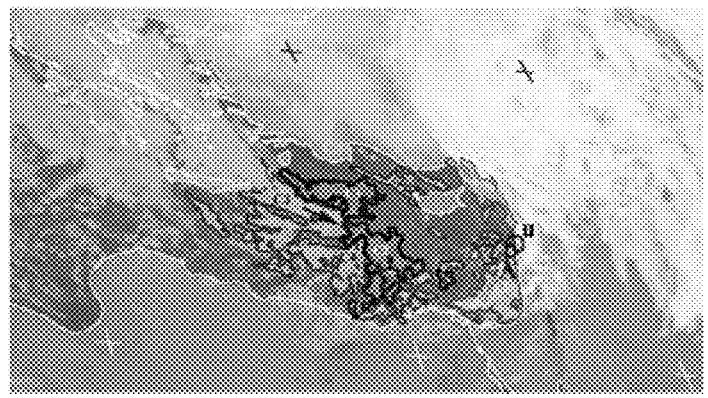

FIG. 8a is an infrared image taken at UTC 12:00 on Jan. 24, 2010, and shows a cloudless space, marked by bold black edge and a location of Beirut, plotted by hollow black edge circle with letter 'u', and Naameh, plotted by black smaller circle with letter 'A'. The same labels will be used in other Figures. FIG. 8b is an infrared image taken at 18:00, and shows thin black edge clouds, e.g., C3 and C4, and bold black edge clouds, e.g., C1 and C2. These clouds appeared suddenly from northwest to southeast. The clouds C3 and C4 are denser than the clouds C1 and C2, indicating the latter contained more heat. They are earthquake clouds.

Figure 8C:
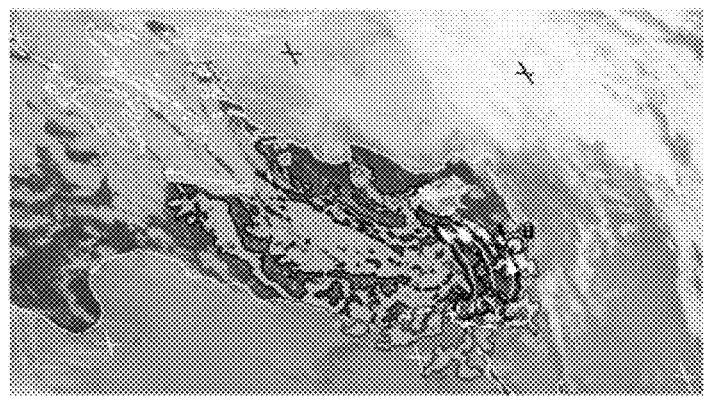

FIG. 8c is an infrared image taken at 0:00 on Jan. 25, 2010, and shows a strong spin anticlockwise, marked by white arrow with letters C5, C6 and C7. Arrow C7 hits Naameh coincidentally.

Figure 8D:
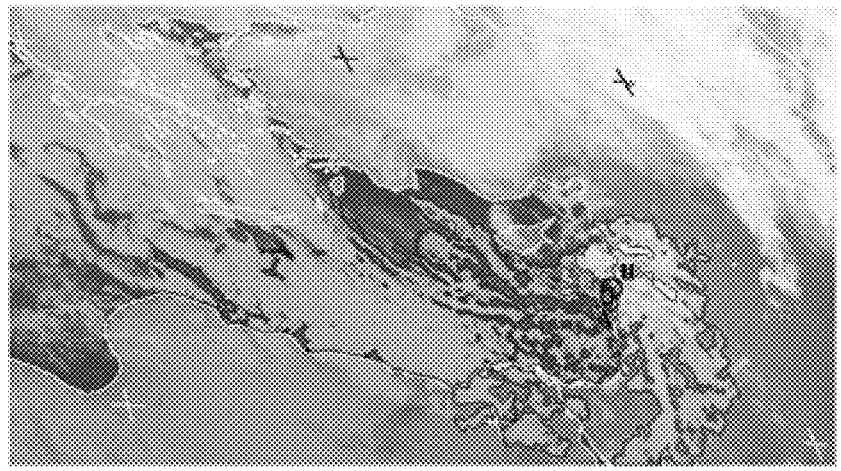

FIG. 8d is an infrared image taken at 6:00, and shows that those earthquake clouds far surpassed Naameh, but the spin became weaker.

Figure 8E:
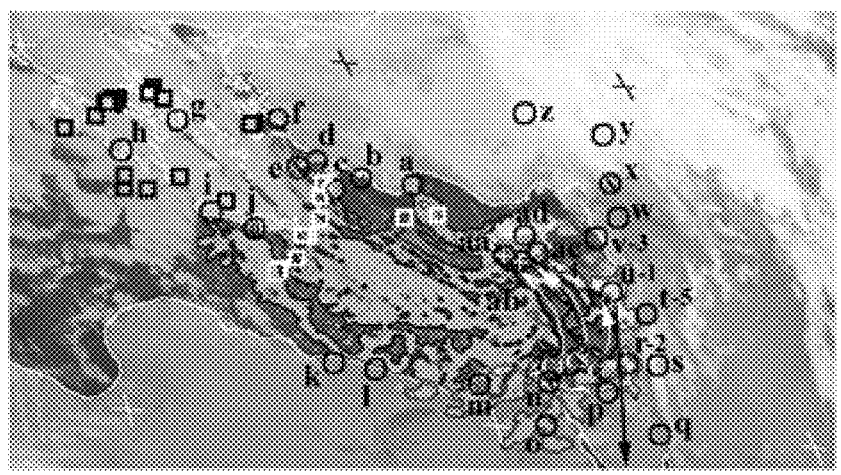

FIG. 8e is the same as FIG. 8c, but has a series of black edge hollow circles with letters 'a' through 'ad' indicating airports, detailed in Table 3, a series of hollow squares, detailed in Table 4, and a black arrow AB to show the direction of the airline. Three airports: Kos (e), Port Said (n) and Gaziantep (x) had the sign 'x' for no abnormal temperature. Two airports: Paphos (aa) and Akrotiri (ab) have the sign '+' for daily maximum increases and one airport Heraklion (j) has '0' for no change. Daily maximum from January 24 to January 25 in Beirut (u) decreased 1° C., while the daily maximum for its neighbors Tel Aviv (r), Lattakia (v), Larnaca (ac) and Damascus (t) decreased 2° C., 3° C., 4° C. and 5° C., respectively.

Table 3 shows temperature change from Jan. 24 to Jan. 25, 2010, recorded by various airports. Except of three airports, Kos (e), Port Said (n) and Gaziantep (x), all other airports recorded abnormal temperatures for pulse increases at night. Moreover, Paphos (aa) and Akrotiri (ab) experienced daily maximum increases due to receiving heat from warm current C4 and C5. Heraklion (j) had no change maybe due to earthquakes nearby. In the column of "Abnormal Pulse Temperature at Night", 'yes' indicates an abnormal increase in temperature at night between Jan. 24 and Jan. 25, 2010, while 'no' indicates no such phenomenon observed at night between Jan. 24 and Jan. 25, 2010.

TABLE 3

Maximum Temperature Change around the East Mediterranean Sea from Jan. 24 to Jan. 25, 2010

| Label | Airport | Country | Latitude | Longitude | Daily Maximum Temperature Change (° C.) | Abnormal Pulse Temperature at Night |
|---|---|---|---|---|---|---|
| a | Antalya | Turkey | 36.7 | 30.7 | −4.4 | Yes |
| b | Dalaman | Turkey | 36.7 | 28.8 | −3.0 | Yes |
| c | Rhodes | Greece | 36.4 | 28.1 | −3.0 | Yes |
| d | Milas | Turkey | 37.2 | 27.7 | −2.0 | Yes |
| e | Kos | Greece | 36.8 | 27.1 | −1.8 | No |
| f | Izmir | Turkey | 38.3 | 27.1 | −2.0 | Yes |
| g | Athens Eleftherios | Greece | 37.9 | 23.9 | −1.0 | Yes |
| h | Kalamata | Greece | 37.1 | 22 | −2.0 | Yes |
| i | Souda | Greece | 35.5 | 24.1 | −0.4 | Yes |
| j | Heraklion | Greece | 35.3 | 25.2 | 0.0 | Yes |
| k | Sidi Barrani | Egypt | 31.6 | 26 | −0.6 | Yes |
| l | Mersa Matruh | Egypt | 31.3 | 27.2 | −2.8 | Yes |
| m | Alexandria | Egypt | 31.2 | 30 | −3.0 | Yes |
| n | Port Said | Egypt | 31.3 | 32.2 | −3.0 | No |
| o | Cairo | Egypt | 30.1 | 31.4 | −1.0 | Yes |
| p | El Arish | Egypt | 31.1 | 33.8 | −4.0 | Yes |
| q | Ovada Int'l Airport | Israel | 29.9 | 34.9 | −4.0 | Yes |
| r | Tel Aviv | Israel | 32 | 34.9 | −1.9 | Yes |
| s | Amman | Jordan | 32 | 36 | −4.0 | Yes |
| t | Damascus | Syria | 33.4 | 36.5 | −4.9 | Yes |
| u | Beirut | Lebanon | 33.8 | 35.5 | −1.0 | Yes |
| v | Lattakia | Syria | 35.5 | 35.8 | −3.0 | Yes |
| w | Aleppo | Syria | 35.5 | 35.8 | −3.0 | Yes |
| x | Gaziantep | Turkey | 37.1 | 37.4 | −2.9 | No |
| y | Malatya | Turkey | 38.4 | 38.1 | −4.0 | Yes |
| z | Kayseri | Turkey | 38.8 | 35.4 | −5.0 | Yes |
| aa | Paphos | Cyprus | 34.7 | 32.5 | 1.1 | Yes |
| ab | Akrotiri | Cyprus | 34.6 | 33 | 0.1 | Yes |
| ac | Larnaca | Cyprus | 34.9 | 33.6 | −3.6 | Yes |
| ad | Ercan | Cyprus | 35.2 | 33.5 | −4.4 | Yes |

Table 4 shows earthquakes, reported by the USGS. In the "Date" column, dates are denoted in the form of year-month-day. For example, "2010-01-26" means Jan. 26, 2010.

TABLE 4

Earthquakes with 112 days after the vapor eruption in Turkey and Greece on Jan. 24, 2007

| Date | UTC | Latitude | Longitude | Magnitude |
|---|---|---|---|---|
| Jan. 26, 2010 | 13:31 | 35.00 | 26.79 | 4.5 |
| Jan. 30, 2010 | 13:47 | 38.33 | 22.42 | 4.7 |
| Feb. 10, 2010 | 19:43 | 36.13 | 22.39 | 4.5 |
| Feb. 11, 2010 | 21:56 | 34.00 | 25.39 | 5.4 |

TABLE 4-continued

Earthquakes with 112 days after the vapor eruption in Turkey and Greece on Jan. 24, 2007

| Date | UTC | Latitude | Longitude | Magnitude |
|---|---|---|---|---|
| Feb. 12, 2010 | 19:48 | 38.36 | 21.96 | 4.2 |
| Feb. 21, 2010 | 1:42 | 37.92 | 21.51 | 4.3 |
| Feb. 28, 2010 | 2:22 | 34.06 | 25.43 | 4.6 |
| Mar. 08, 2010 | 13:12 | 38.41 | 22.29 | 4.5 |
| Mar. 09, 2010 | 2:01 | 38.87 | 23.64 | 4.3 |
| Mar. 09, 2010 | 2:55 | 38.86 | 23.56 | 4.6 |
| Mar. 12, 2010 | 1:53 | 36.43 | 23.49 | 4.2 |
| Mar. 12, 2010 | 11:42 | 35.58 | 27.21 | 4.2 |
| Mar. 13, 2010 | 10:27 | 35.79 | 30.97 | 4.1 |
| Mar. 26, 2010 | 18:35 | 38.17 | 26.31 | 4.9 |
| Mar. 26, 2010 | 19:25 | 38.15 | 26.31 | 4.2 |
| Apr. 04, 2010 | 22:05 | 38.42 | 22.32 | 4.4 |
| Apr. 09, 2010 | 7:09 | 35.70 | 29.37 | 4.2 |
| Apr. 13, 2010 | 15:18 | 36.20 | 27.48 | 4.2 |
| Apr. 13, 2010 | 19:25 | 36.18 | 21.75 | 4.4 |
| Apr. 20, 2010 | 3:19 | 37.47 | 20.52 | 4 |
| Apr. 24, 2010 | 15:01 | 34.35 | 26.06 | 5.2 |
| Apr. 26, 2010 | 10:26 | 34.94 | 26.50 | 4.4 |
| Apr. 26, 2010 | 14:21 | 38.37 | 22.23 | 4.2 |
| Apr. 28, 2010 | 16:35 | 36.32 | 27.66 | 4.4 |
| May 02, 2010 | 12:24 | 35.86 | 24.75 | 4.3 |
| May 11, 2010 | 7:03 | 38.62 | 23.77 | 4.2 |
| May 11, 2010 | 20:23 | 36.32 | 21.88 | 4.2 |

Illustrative Operations

Figure 9:
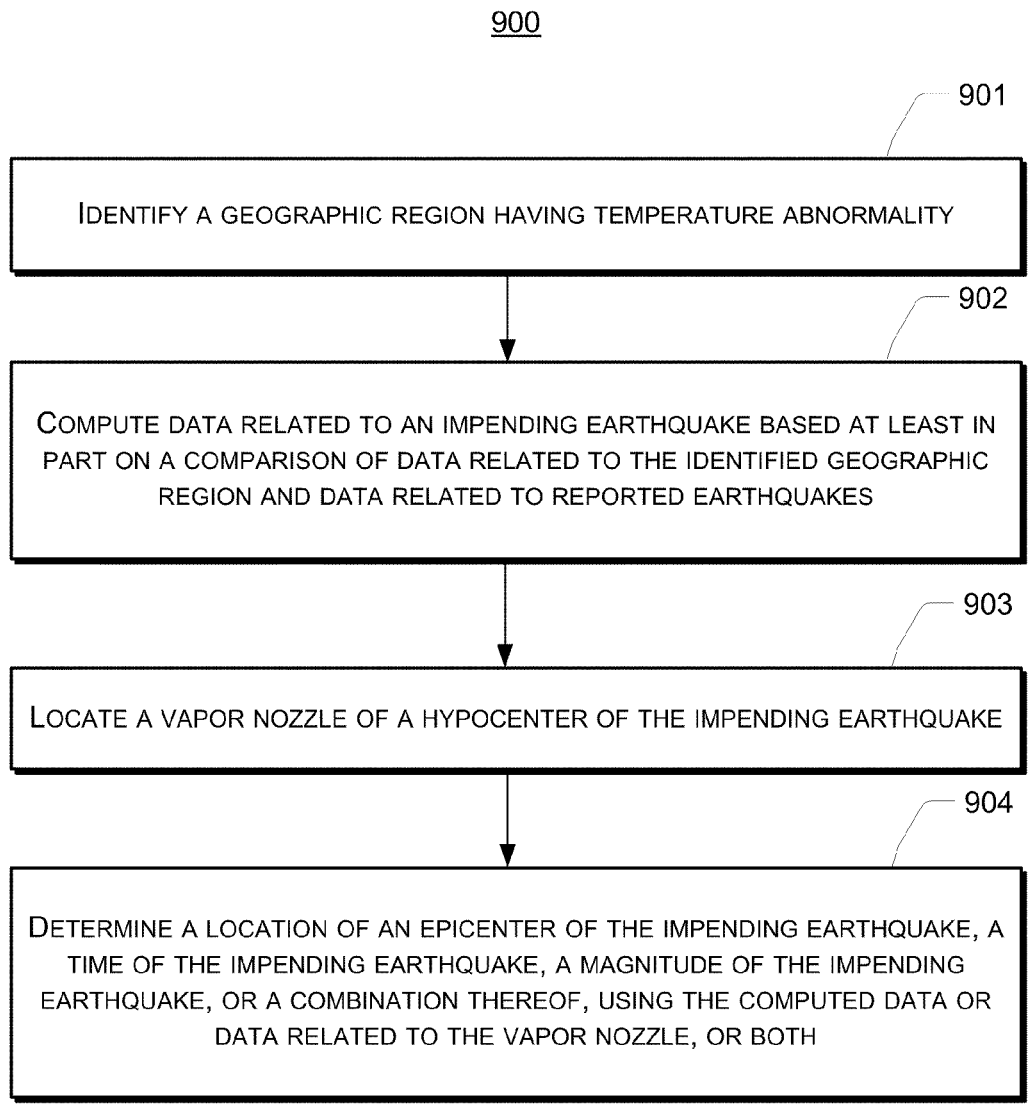
FIG. 9 is a flowchart of a method of earthquake prediction in accordance with an embodiment of the present disclosure.

FIG. 9 is a flowchart of a method 900 of earthquake prediction in accordance with an embodiment of the present disclosure.

At 901, the method 900 identifies a geographic region having temperature abnormality caused by an earthquake vapor eruption. At 902, the method 900 computes data related to an impending earthquake based at least in part on a comparison of data related to the identified geographic region and data related to reported earthquakes. At 903, the method 900 locates a vapor nozzle of a hypocenter of the impending earthquake. At 904, the method 900 determines a location of an epicenter of the impending earthquake, a time of the impending earthquake, a magnitude of the impending earthquake, or a combination thereof, using the data computed in 902 or data related to the vapor nozzle, or both.

In one embodiment, the method 900 may identify the geographic region having temperature abnormality using a plurality of satellite infrared images. Alternatively, the geographic region having temperature abnormality may be identified using one or more land temperature scanners in the event that perfect or near-perfect satellite images are unavailable.

Optionally, the method 900 may further comprise using an infrared thermometer to aid locating the vapor nozzle in an event that one or more of the plurality of satellite infrared images have a low resolution or a low frequency.

Preferably, the plurality of satellite infrared images may comprise a plurality of satellite infrared images taken under one or more infrared wavelengths in a first range of 3.48 μm-4.36 μm, a second range of 12.4 μm-14.4 μm, or both.

In one embodiment, the computed data related to the impending earthquake may comprise a location of the vapor nozzle of the hypocenter of the impending earthquake, or the location of the vapor nozzle of the hypocenter and a magnitude of the impending earthquake.

In one embodiment, the method 900 may locate the vapor nozzle of the hypocenter of the impending earthquake by using the computed data.

In one embodiment, the method 900 may locate the vapor nozzle of the hypocenter of the impending earthquake by identifying a geographic location having exhibited a first temperature peak as the vapor nozzle.

Preferably, the first temperature peak may comprise a temperature of at least 100° C. or a lower but abnormal temperature. The reason why a temperature lower than 100° C. but abnormal may be taken as the first temperature peak is because of delay in measurement of the temperature (e.g., the original temperature may be at least 100° C. at one point in time but cools off to a lower temperature when the lower temperature is measured).

Optionally, the method 900 may also comprise monitoring temperature variations of the vapor nozzle to identify a second temperature peak that occurs after the first temperature peak. Optionally, the method 900 may further comprise determining the time of the impending earthquake to be within a predetermined period of time from the second temperature peak.

In one embodiment, the method 900 may further comprise sending a warning signal in an event that the determined magnitude of the impending earthquake exceeds a threshold value.

In one embodiment, the method 900 may further comprise a process 1005 to establish a database that stores data related to reported earthquakes.

Figure 10:
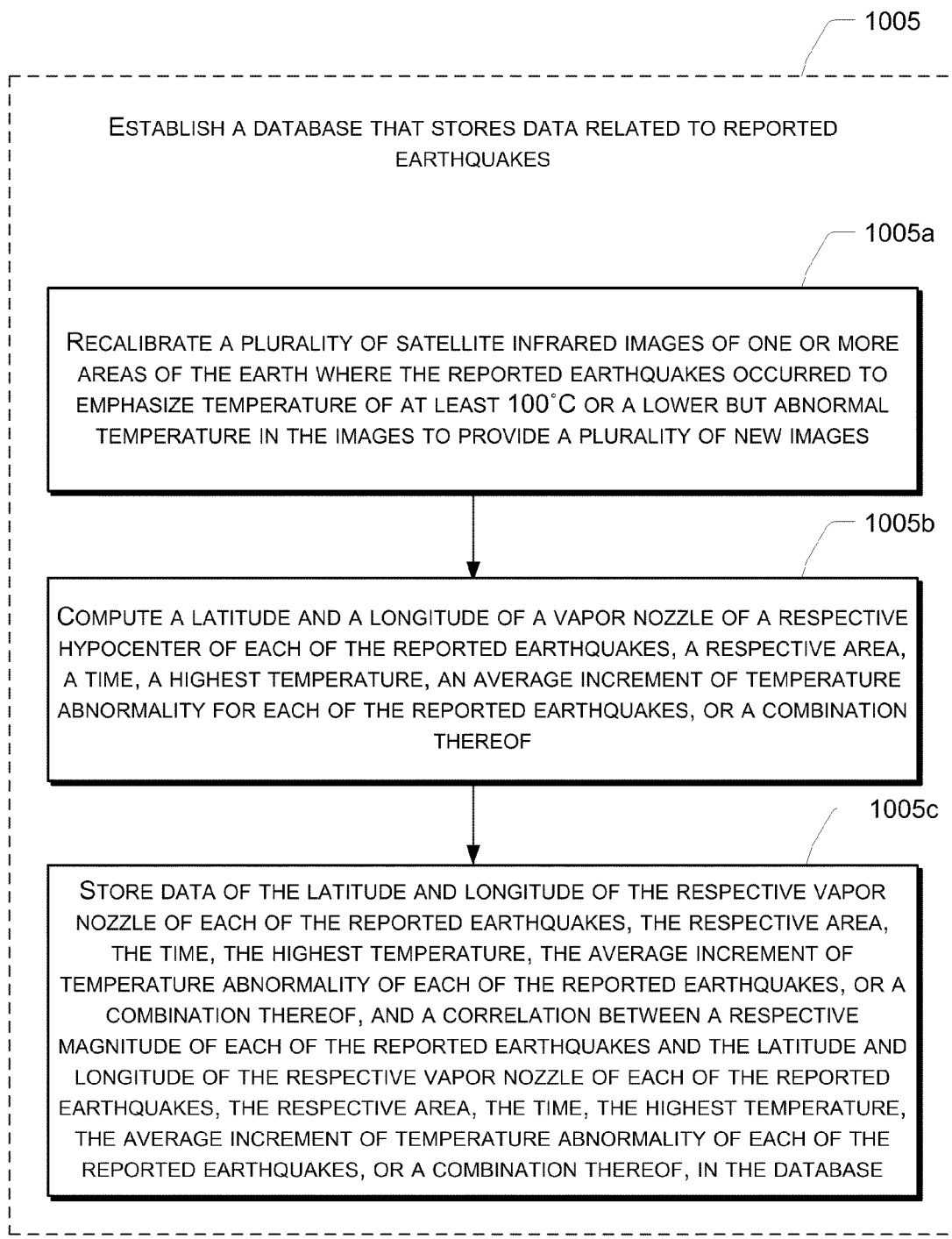
FIG. 10 is a flowchart of a method of establishing a database that stores data related to reported earthquakes in accordance with an embodiment of the present disclosure.

FIG. 10 is a flowchart of the process 1005 of establishing a database that stores data related to reported earthquakes in accordance with an embodiment of the present disclosure.

At 1005a, the process 1005 recalibrates a plurality of satellite infrared images of one or more areas of the earth where the reported earthquakes occurred to emphasize temperature of at least 100° C. or a lower but abnormal temperature in the images to provide a plurality of new images. At 1005b, the process 1005 computes a latitude and a longitude of a vapor nozzle of a respective hypocenter of each of the reported earthquakes, a respective area, a time, a highest temperature, an average increment of temperature abnormality for each of the reported earthquakes, or a combination thereof. At 1005c, the process 1005 stores data of the latitude and longitude of the respective vapor nozzle of each of the reported earthquakes or the respective area, the time, the highest temperature, the average increment of temperature abnormality of each of the reported earthquakes, or a combination thereof, and a correlation between a respective magnitude of each of the reported earthquakes and the latitude and longitude of the respective vapor nozzle of each of the reported earthquakes or the respective area, the time, the highest temperature, the average increment of temperature abnormality of each of the reported earthquakes, or a combination thereof, in the database.

Figure 11:
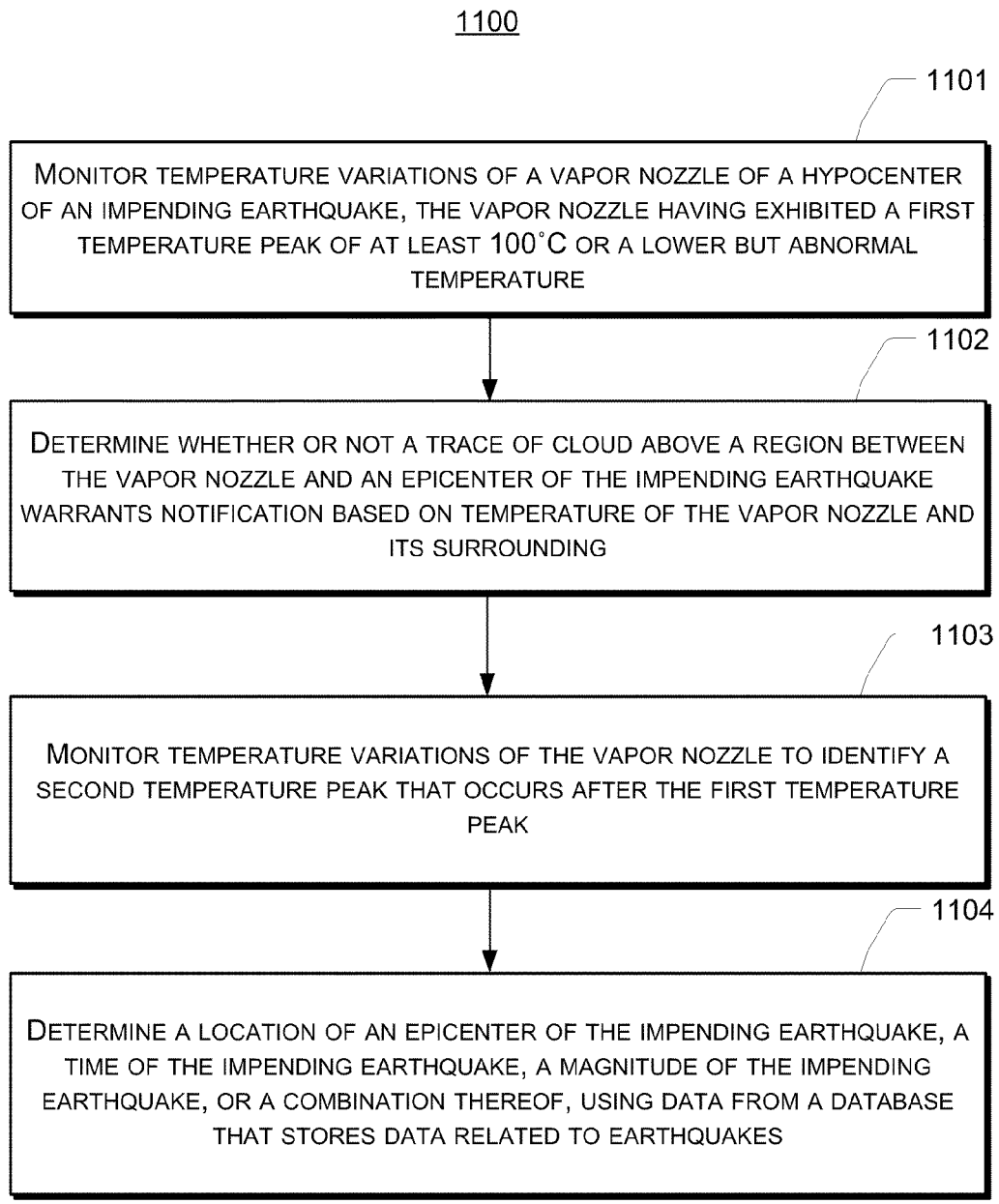
FIG. 11 is a flowchart of a method of earthquake prediction in accordance with another embodiment of the present disclosure.

FIG. 11 is a flowchart of a method 1100 of earthquake prediction in accordance with another embodiment of the present disclosure.

At 1101, the method 1100 monitors temperature variations of a vapor nozzle of a hypocenter of an impending earthquake, the vapor nozzle having exhibited a first temperature peak of at least 100° C. or a lower but abnormal temperature (due to delay in measurement of the temperature). At 1102, the method 1100 determine whether or not a trace of cloud above a region between the vapor nozzle and an epicenter of the impending earthquake warrants notification based on temperatures of the vapor nozzle and its surrounding. At 1103, the method 1100 monitors temperature variations of the vapor nozzle to identify a second temperature peak that occurs after the first temperature peak. At 1104, the method 1100 determines a location of the epicenter of the impending earthquake, a time of the impending earthquake, a magnitude of the impending earthquake, or a combination thereof, using data from a database that stores data related to earthquakes.

In one embodiment, the method 1100 establishes a database that stores the data related to reported earthquakes according to the process 1005 illustrated in FIG. 10. In the interest of brevity, details of the process 1005 will not be repeated.

In one embodiment, the plurality of satellite infrared images may comprise a plurality of satellite infrared images taken under one or more infrared wavelengths in a first range of 3.48 µm-4.36 µm, a second range of 12.4 µm-14.4 µm, or another range of wavelengths if it exists.

In one embodiment, the method 1100 may further comprise a process 1205 to determine a magnitude of an impending earthquake.

Figure 12:
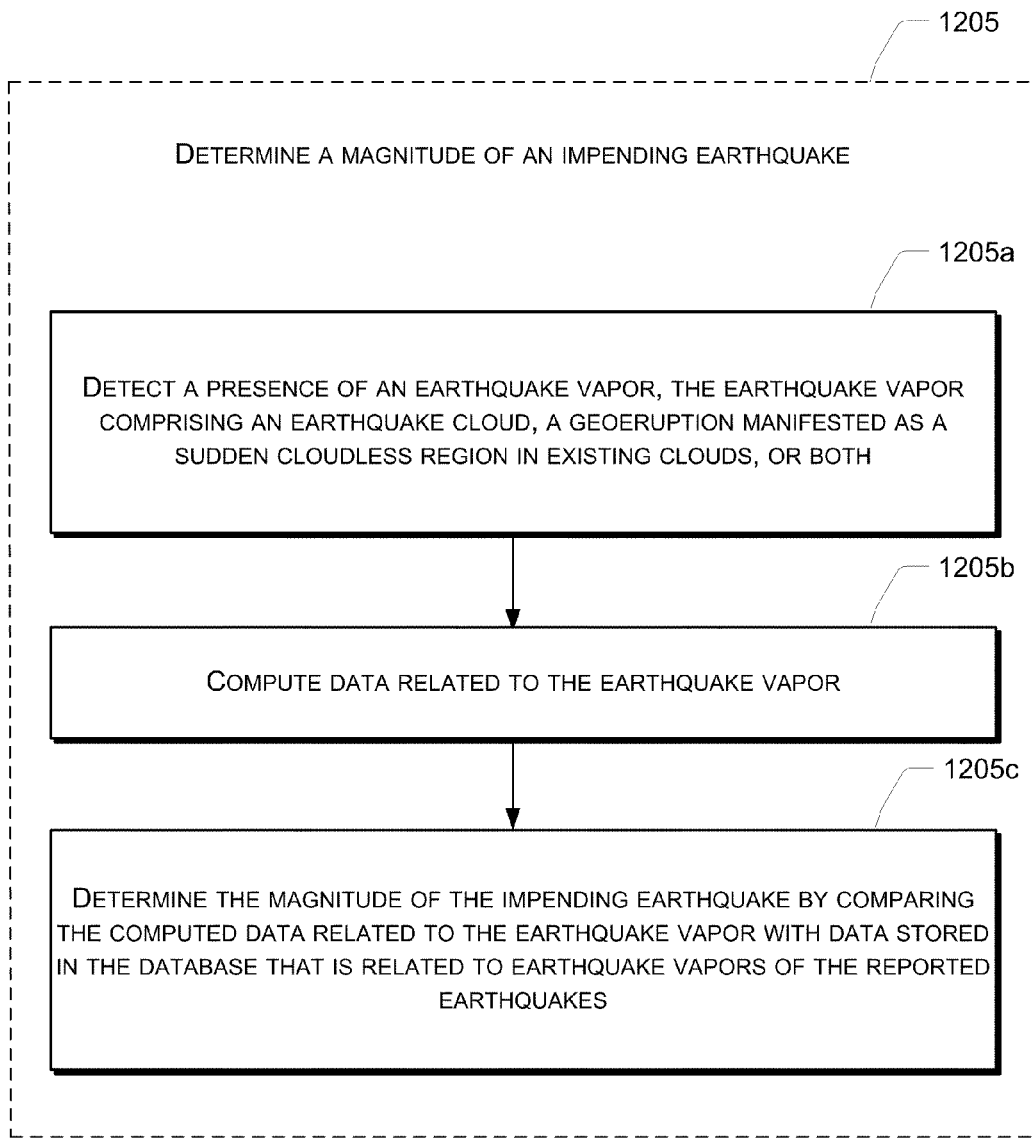
FIG. 12 is a flowchart of a method of determining a magnitude of an impending earthquake in accordance with an embodiment of the present disclosure.

FIG. 12 is a flowchart of the process 1205 of determining a magnitude of an impending earthquake in accordance with an embodiment of the present disclosure.

At 1205*a*, the process 1205 detects a presence of an earthquake vapor, the earthquake vapor comprising an earthquake cloud, a geoeruption manifested as a sudden cloudless space in an existing cloud, or both. At 1205*b*, the process 1205 computes data related to the earthquake vapor. At 1205*c*, the process 1205 determines the magnitude of the impending earthquake by comparing the computed data related to the earthquake vapor with data stored in the database that is related to earthquake vapors of the reported earthquakes.

FIG. 13 is a flowchart of a method 1300 of prevention of mysterious air and sea accidents in accordance with an embodiment of the present disclosure.

At 1301, the method 1300 detects, by a computing device, a presence of an earthquake vapor by comparing differences in intensity in a plurality of satellite infrared images taken under one or more wavelengths in a first range of 3.48 µm-4.36 µm and under one or more wavelengths in a second range of 12.4 µm-14.4 µm, or another range of wavelengths if it exists. At 1302, the method 1300 disseminates information related to the earthquake vapor.

In one embodiment, the computing device may comprise a land-based computing device, and wherein disseminating information related to the earthquake vapor may comprise disseminating information related to the earthquake vapor to at least one vessel navigating within a predetermined distance of the earthquake vapor.

In one embodiment, the computing device may comprise a computing device on a vessel, and wherein disseminating information related to the earthquake vapor may comprise disseminating information related to the earthquake vapor to a pilot of the vessel, one or more other vessels, one or more land-based stations, or a combination thereof.

In one embodiment, the method 1300 may further comprise determining a distance between the earthquake vapor and a vessel (e.g., an airplane or a ship). In another embodiment, after determining a distance between the earthquake vapor and a vessel, the method 1300 may further comprise at least one of the following: reorganizing a meteorological data record system and an analysis system in an airport to find earthquake vapor; modifying the meteorological data record system and the analysis system in the airplane to find earthquake vapor; or modifying a control system of an airplane to improve the airplane's ability against effect of earthquake vapor.

As sensors in airports and on airplanes, such as temperature sensors and wind speed/direction sensors, typically record the average value but not differentials between different readings (e.g., secondary temperature distribution), there is usually no recording of secondary temperature distribution among different parts of an airplane upward, downward, forward, backward, leftward, or rightward in the black box of an airplane. Moreover, the black box typically records two pages of data provided from a single sensor from each of the two wings of the airplane. Consequently, it is very difficult, if not impossible, to determine the cause of an air crash if it is due to earthquake vapor. It is believed that the above embodiments would help alleviate this problem.

Exemplary Computing Device

Figure 14:
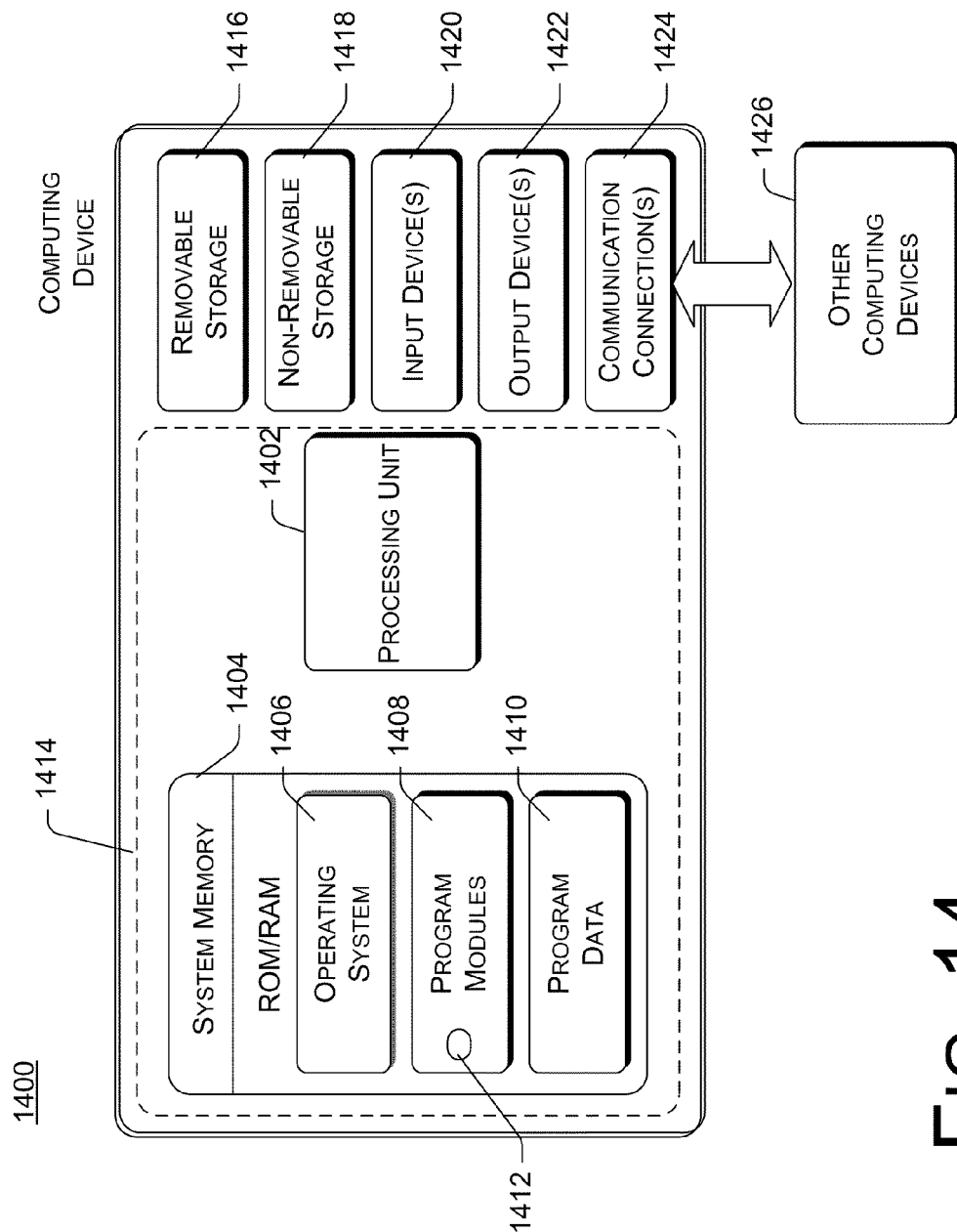
FIG. 14 illustrates a representative computing device that may implement the techniques for precise earthquake prediction and prevention of mysterious air and sea accidents in accordance with an embodiment of the present disclosure.

FIG. 1400 illustrates a representative computing device 1400 that may implement the techniques for precise earthquake prediction and prevention of mysterious air and sea accidents. That is, the computing device 1400 may be used to implement method 900, process 1005, method 1100, process 1205, method 1300 and any variations thereof. However, it will be readily appreciated that the techniques disclosed herein may be implemented in other computing devices, systems, and environments. The computing device 1400 shown in FIG. 14 is only one example of a computing device and is not intended to suggest any limitation as to the scope of use or functionality of the computer and network architectures.

In at least one configuration, computing device 1400 typically includes at least one processing unit 1402 and system memory 1404. Depending on the exact configuration and type of computing device, system memory 1404 may be volatile (such as RAM), non-volatile (such as ROM, flash memory, etc.) or some combination thereof. System memory 1404 may include an operating system 1406, one or more program modules 1408, and may include program data 1410. The computing device 1400 is of a very basic configuration demarcated by a dashed line 1414. Again, a terminal may have fewer components but may interact with a computing device that may have such a basic configuration.

In one embodiment, the program module 1408 includes an earthquake prediction module 1412. The earthquake prediction module 1412 may carry out one or more processes as described above with reference to FIGS. 9-13.

Computing device 1400 may have additional features or functionality. For example, computing device 1400 may also include additional data storage devices (removable and/or non-removable) such as, for example, magnetic disks, optical disks, or tape. Such additional storage is illustrated in FIG. 14 by removable storage 1416 and non-removable storage 1418, both of which capable of storing non-transitory signals. Computer storage media may include volatile and nonvolatile, removable and non-removable media implemented in any method or technology for storage of information, such as computer readable instructions, data structures, program modules, or other data. System memory 1404, removable storage 1416 and non-removable storage 1418 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1400. Any such computer storage media may be part of the computing device 1400. Computing device 1400 may also have input device(s) 1420 such as keyboard, mouse, pen, voice input device, touch input device, infrared scanner device, etc. Output device(s) 1422 such as a display, speakers, printer, etc. may also be included.

Computing device 1400 may also contain communication connections 1424 that allow the device to communicate with other computing devices 1426, such as over a network. These networks may include wired networks as well as wireless networks. Communication connections 1424 are some examples of communication media. Communication media may typically be embodied by computer readable instructions, data structures, program modules, etc.

It is appreciated that the illustrated computing device 1400 is only one example of a suitable device and is not intended to suggest any limitation as to the scope of use or functionality of the various embodiments described. Other well-known computing devices, systems, environments and/or configurations that may be suitable for use with the embodiments include, but are not limited to personal computers, server computers, hand-held or laptop devices, multiprocessor systems, microprocessor-base systems, set top boxes, game consoles, programmable consumer electronics, network PCs, minicomputers, mainframe computers, distributed computing environments that include any of the above systems or devices, and/or the like.

CONCLUSION

The above-described techniques pertain to precise earthquake prediction and prevention of mysterious air and sea accidents. Although the techniques have been described in language specific to structural features and/or methodological acts, it is to be understood that the appended claims are not necessarily limited to the specific features or acts described. Rather, the specific features and acts are disclosed as exemplary forms of implementing such techniques.

All references, including publications, cited herein are hereby incorporated by reference to the same extent as if each reference were individually and specifically indicated to be incorporated by reference and were set forth in its entirety herein.

What is claimed is:

1. A computing device for earthquake prediction, the computing device comprising:
   a processing unit; and
   memory, the memory comprising a program module configured to carry out the following:
      identifying a geographic region having temperature abnormality;
      computing data related to an impending earthquake based at least in part on a comparison of data related to the identified geographic region and data related to reported earthquakes;
      locating a vapor nozzle of a hypocenter of the impending earthquake by identifying a geographic location having exhibited a first temperature peak as the vapor nozzle; and
      determining a location of an epicenter of the impending earthquake, a time of the impending earthquake, a magnitude of the impending earthquake, or a combination thereof, using the computed data or data related to the vapor nozzle, or both.

2. The computing device as recited in claim 1, wherein identifying a geographic region having temperature abnormality comprises identifying the geographic region having temperature abnormality using a plurality of satellite infrared images or one or more land temperature scanners.

3. The computing device as recited in claim 2, wherein the plurality of satellite infrared images comprises a plurality of satellite infrared images taken under one or more infrared wavelengths in a first range of 3.48 µm-4.36 µm, a second range of 12.4 µm-14.4 µm, or another range of wavelengths.

4. The computing device as recited in claim 2, wherein the program module is further configured to:
   aid locating the vapor nozzle using an infrared thermometer in an event that one or more of the plurality of satellite infrared images have a low resolution or a low frequency.

5. The computing device as recited in claim 1, wherein the computed data related to the impending earthquake comprises a location of the vapor nozzle of the hypocenter of the impending earthquake, or the location of the vapor nozzle of the hypocenter and a magnitude of the impending earthquake.

6. The computing device as recited in claim 1, wherein locating a vapor nozzle of a hypocenter of the impending earthquake comprises locating the vapor nozzle of the hypocenter of the impending earthquake by using the computed data.

7. The computing device as recited in claim 1, wherein the first temperature peak comprises a temperature of at least 100° C. or a lower but abnormal temperature.

8. The computing device as recited in claim 1, wherein the program module is further configured to:
   monitor temperature variations of the vapor nozzle to identify a second temperature peak that occurs after the first temperature peak.

9. The computing device as recited in claim 8, wherein the program module is further configured to carry out:
   determine the time of the impending earthquake to be within a predetermined period of time from the second temperature peak.

10. The computing device as recited in claim 1, wherein the program module is further configured to establish a database that stores the data related to reported earthquakes by:
   recalibrating a plurality of satellite infrared images of one or more areas of the earth where the reported earthquakes occurred to emphasize temperature of at least 100° C. or a lower but abnormal temperature in the images to provide a plurality of new images;
   computing a latitude and a longitude of a vapor nozzle of a respective hypocenter of each of the reported earthquakes, a respective area, a time, a highest temperature, an average increment of temperature abnormality for each of the reported earthquakes, or a combination thereof; and
   storing data of the latitude and longitude of the respective vapor nozzle of each of the reported earthquakes, the respective area, the time, the highest temperature, the average increment of temperature abnormality for each of the reported earthquakes, or a combination thereof, and a correlation between a respective magnitude of each of the reported earthquakes and the latitude and longitude of the respective vapor nozzle of each of the reported earthquakes, the respective area, the time, the highest temperature, the average increment of temperature abnormality for each of the reported earthquakes, or a combination thereof, in a database.

11. The computing device as recited in claim 1, wherein the program module is further configured to:
   send a warning signal in an event that the determined magnitude of the impending earthquake exceeds a threshold value.

12. A computing device for earthquake prediction, the computing device configured to:
   monitor temperature variations of a vapor nozzle of a hypocenter of an impending earthquake, the vapor nozzle having exhibited a first temperature peak of at least 100° C. or a lower but abnormal temperature;
   determine whether or not a trace of cloud above a region between the vapor nozzle and an epicenter of the impending earthquake warrants notification based on temperatures of the vapor nozzle and its surrounding;

monitor temperature variations of the vapor nozzle to identify a second temperature peak that occurs after the first temperature peak; and determine a location of an epicenter of the impending earthquake, a time of the impending earthquake, a magnitude of the impending earthquake, or a combination thereof, using data from a database that stores data related to earthquakes.

13. The computing device as recited in claim 12, further configured to establish a database that stores the data related to earthquakes by:

recalibrating a plurality of satellite infrared images of one or more areas of the earth where the reported earthquakes occurred to emphasize temperature of at least 100° C. or a lower but abnormal temperature in the images to provide a plurality of new images;

computing a latitude and a longitude of a vapor nozzle of a respective hypocenter of each of the earthquakes, a respective area, a time, a highest temperature, an average increment of temperature abnormality for each of the earthquakes, or a combination thereof; and storing data of the latitude and longitude of the respective vapor nozzle of each of the earthquakes, the respective area, the time, the highest temperature, the average increment of temperature abnormality for each of the earthquakes, or a combination thereof, and a correlation between a respective magnitude of each of the reported earthquakes and the latitude and longitude of the respective vapor nozzle of each of the reported earthquakes, the respective area, the time, the highest temperature, the average increment of temperature abnormality for each of the earthquakes, or a combination thereof, in the database.

14. The computing device as recited in claim 13, wherein the plurality of satellite infrared images comprises a plurality of satellite infrared images taken under one or more infrared wavelengths in a first range of 3.48 μm-4.36 μm, a second range of 12.4 μm-14.4 μm, or another range of wavelengths.

15. The computing device as recited in claim 12, further configured to determine a magnitude of the impending earthquake by:

detecting a presence of an earthquake vapor, the earthquake vapor comprising an earthquake cloud, a geoeruption manifested as a sudden cloudless space in an existing cloud, or both;

computing data related to the earthquake vapor; and determining the magnitude of the impending earthquake by comparing the computed data related to the earthquake vapor with data stored in the database that is related to earthquake vapors of the reported earthquakes.

16. A computing device for prevention of mysterious air and sea accidents, the computing device configured to:

detect a presence of an earthquake vapor by comparing differences in intensity in a plurality of satellite infrared images taken under one or more wavelengths in a first range of 3.48 μm-4.36 μm, under one or more wavelengths in a second range of 12.4 μm-14.4 μm, or under another range of wavelengths;

disseminate information related to the earthquake vapor;

determine a distance between the earthquake vapor and a vessel; and carry out at least one of the following:

reorganizing a meteorological data record system and an analysis system in an airport to find earthquake vapor;

modifying the meteorological data record system and the analysis system in the airplane to find earthquake vapor; or modifying a control system of an airplane to improve the airplane's ability against effect of earthquake vapor.

17. The computing device as recited in claim 16, wherein the computing device comprises a land-based computing device, and wherein the computing device disseminates the information related to the earthquake vapor to at least one vessel navigating within a predetermined distance of the earthquake vapor.

18. The computing device as recited in claim 16, wherein the computing device comprises a computing device on a vessel, and wherein the computing device disseminates the information related to the earthquake vapor to a pilot of the vessel, one or more other vessels, one or more land-based stations, or a combination thereof.

* * * * *